(12) United States Patent
White et al.

(10) Patent No.: US 8,088,196 B2
(45) Date of Patent: Jan. 3, 2012

(54) PURIFICATION OF CARBON DIOXIDE

(75) Inventors: Vincent White, Epsom (GB); Rodney John Allam, Chippenham (GB)

(73) Assignee: Air Products and Chemicals, Inc., Allentown, PA (US)

( * ) Notice: Subject to any disclaimer, the term of this patent is extended or adjusted under 35 U.S.C. 154(b) by 1133 days.

(21) Appl. No.: 11/656,913

(22) Filed: Jan. 23, 2007

(65) Prior Publication Data
US 2008/0176174 A1 Jul. 24, 2008

(51) Int. Cl.
*B01D 53/22* (2006.01)
(52) U.S. Cl. ............... 95/51; 55/339; 55/340; 95/43; 95/45; 96/4
(58) Field of Classification Search ............. 95/45, 51, 95/43; 96/4; 55/339, 340
See application file for complete search history.

(56) References Cited

U.S. PATENT DOCUMENTS

| | | |
|---|---|---|
| 3,469,410 A | 9/1969 | Schramm et al. |
| 4,595,404 A | 6/1986 | Ozero et al. |
| 4,602,477 A | 7/1986 | Lucadamo |
| 4,639,257 A | 1/1987 | Duckett et al. |
| 4,657,564 A * | 4/1987 | Langsam ........................... 95/51 |
| 4,762,543 A | 8/1988 | Pantermuehl et al. |
| 4,952,223 A | 8/1990 | Kirshnamurthy et al. |
| 4,977,745 A | 12/1990 | Heichberger |
| 5,927,103 A | 7/1999 | Howard |
| 5,974,829 A | 11/1999 | Novak et al. |
| 6,035,662 A | 3/2000 | Howard et al. |
| 6,210,467 B1 | 4/2001 | Howard |
| 6,436,337 B1 * | 8/2002 | Gross .............................. 266/242 |
| 6,477,859 B2 | 11/2002 | Wong et al. |
| 6,648,949 B1 | 11/2003 | Der et al. |
| 6,748,932 B1 * | 6/2004 | Sorter et al. .................... 123/527 |
| 7,028,622 B2 * | 4/2006 | Taylor ............................. 110/265 |
| 7,666,251 B2 | 2/2010 | Shah et al. |
| 2002/0059807 A1 | 5/2002 | Wong et al. |
| 2005/0155379 A1 | 7/2005 | Gershtein et al. |
| 2007/0207419 A1 * | 9/2007 | Patrick ................................ 431/8 |

FOREIGN PATENT DOCUMENTS

| | | |
|---|---|---|
| EP | 0 410 845 A1 | 1/1991 |
| EP | 0 965 564 A1 | 12/1999 |
| EP | 0 964 215 B1 | 9/2004 |
| GB | 2 151 597 A | 7/1985 |
| GB | 2 174 379 A | 11/1986 |
| WO | 03/033428 A1 | 4/2003 |

OTHER PUBLICATIONS

Anheden et al. ("Denitrogenation (or Oxyfuel Concepts)") Oil & Gas Science and Technology—Rev. IFP, vol. 60 (2005), No. 3, pp. 485-495.*

(Continued)

*Primary Examiner* — Jason M Greene
*Assistant Examiner* — Anthony Shumate
(74) *Attorney, Agent, or Firm* — Willard Jones, II

(57) ABSTRACT

Carbon dioxide and oxygen are separated from a feed gas, preferably derived from flue gas from an oxyfuel combustion process, by diffusion across at least one membrane in a membrane separation system to produce separated carbon dioxide gas comprising oxygen, which is fed to the oxyfuel combustion process to improve the performance of the process.

25 Claims, 3 Drawing Sheets

OTHER PUBLICATIONS

Buhre et al. ("Oxy-fuel combustion technology for coal-fired power generation") Progress in Energy and Combustion Science 31 (2005) 283-307.*

Farley ("Developing Oxyfuel Capture as a Retrofit Technology") Modern Power Systems Apr. 2006, pp. 20-22.*

Jordal et al. (Oxyfuel Combustion for Coal-Fired Power Generation With CO2 Capture—Opportunities and Challenges) date unknown, <http://uregina.ca/ghgt7/PDF/papers/peer/054.pdf>, pp. 1-9.*

Steeneveldt et al. ("CO2 Capture and Storage Closing the Knowing—Doing Gap") Institution of Chemical Engineers Trans IChemE, Part A, Sep. 2006, Chemical Engineering Research and Design, 84(A9): 739-763.*

Wilkinson et al. ("Oxyfuel Conversion of Heaters and Boilers for CO2 Capture") Second National Conference on Carbon Sequestration, May 5-8, 2003, Washington, DC pp. 1-14.*

Beal et al. ("Putting Combustion and Gasification in the Loop") Modern Power Systems, Dec. 2005, vol. 25 Issue 11, p. 15-18.*

Hagg et al. ("CO2 Capture from Natural Gas Fired Power Plants by Using Membrane Technology") Ind. Eng. Chem. Res. 2005, 44, 7668-7675.*

Bequette "Process Control Modeling, Design, and Simulation" Prentice Hall, p. 455, 2003.*

Perry et al. (1997). Perry's Chemical Engineers' Handbook (7th Edition). p. 7-20, McGraw-Hill.*

U.S. Appl. No. 11/287,640, filed Nov. 28, 2005, Allam et al.

Allam, et al., "The Oxyfuel Baseline: Revamping Heaters and Boilers to Oxyfiring by Cryogenic Air Separation and Flue Gas Recycle", Carbon Dioxide Capture for Storage in Deep Geologic Formations, Elsevier Ltd., vol. 1, 2005, pp. 451-475.

Allam, et al., "A Study of the Extraction of CO2 From the Flue Gas of a 500 MW Pulverised Coal Fired Boiler", Energy Consers. Mgmt., vol. 33, No. 5-8, 1992, pp. 373-378.

White, et al., "Purification of Oxyfuel-Derived CO2 for Sequestration or EOR", Presented at the 8$^{th}$ Greenhouse Gas Control Technologies Conference (GHGT-8), Trondheim, Jun. 2006, pp. 1-6.

Thomas, D.C.; "Carbon Dioxide Capture for Storage in Deep Geologic Formations—Results from the CO2 Capture Project, Capture and Separation of Carbon Dioxide from Combustion Sources"; Elsevier; 2005; vol. 1; pp. 451-475.

White, V, et al; "Purificition of Oxyfuel-Serived CO2 for Sequestration or EOR (Enhanced Oil Recovery)"; International Conference on Greenhouse Gas Control Technologies; Jan. 1, 2006; p. 1-6; XP009093665.

Michele Aresta, "Carbon Dioxide Recovery and Utilization", Kluwer Academic Publishers, Aug. 31, 2003, 53-114.

Flynn, "Cryogenic engineering", Marcel Dekker Inc., 1997.

Soundarrajan, et al, "Optimal Design for Integrating CO2 Capture and Fuel Conversion Technologies in a 500 MWE Coal-based Power Plant", presented at the 23rd Int'l Pittsburgh Coal Conference, Pittsburgh, PA,Sep. 26-28, 2006 (abstract 18-4), pp. 1-20.

Hoffman et al, "Experimental Investigation of a Molecular Gate Membrane for Separation of Carbon Dioxide from Flue Gas", presented at the 23rd Int'l Pittsburgh Coal Conference, Pittsburgh, PA, Sep. 28-26, 2006, (abstract 30-1), pp. 1-15.

Kumar, et al, "PEI / MCM-48 Composite Membranes for Carbon Dioxide Separation", presented at the 22nd Int'l Pittsburgh Coal Conference, Pittsburgh, PA, Sep. 11-15, 2005, (abstract 28-1), 18 pages.

Luebke et al, "Surface Selective Membranes for Carbon Dioxide Separation", presented at the 22nd Int'l Pittsburgh Coal Conference, Pittsburgh, PA,Sep. 11-15, 2005, (abstract 29-5), 12 pages.

Intergovernmental Panel on Climate Change, "IPCC Special Report: Carbon dioxide capture and storage", IPCC Working Group III, 8th Session, Montreal, Canada, Sep. 22-24, 2005 and IPCC 24th Session, Montreal, Canada, Sep. 26-28, 2005, pp. 105-178.

* cited by examiner

PURIFICATION OF CARBON DIOXIDE

BACKGROUND OF THE INVENTION

The invention relates to a method and apparatus for the oxyfuel combustion of a fuel selected from the group consisting of carbonaceous fuel; hydrocarbonaceous fuel; and mixtures thereof. The invention involves a membrane separation system to separate carbon dioxide from a feed gas and using the separated carbon dioxide gas to improve performance of the oxyfuel combustion process.

There is an urgent need to develop new processes for production of electrical energy from fossil fuels, carbonaceous fuels or hydrocarbon fuels with capture of carbon dioxide. The new processes should ideally be more efficient and cost effective than existing processes. Oxyfuel combustion processes are being considered in this context.

In oxyfuel combustion, a fuel is combusted in pure oxygen with optional recycle of cooled flue gas or steam or water to moderate the flame temperature. The elimination of the bulk of the nitrogen from the combustion results in a net flue gas which has a high carbon dioxide concentration following cooling and water condensation.

An oxyfuel combustion process is ideally suited for use in a conventional pulverized coal fired boiler for generation of steam used for electric power production. The use of oxyfuel combustion in a pulverized coal fired boiler results in a net flue gas production which, after cooling and condensation of contained water vapor, typically comprises from about 65 mol % to about 95 mol % carbon dioxide and up to about 5 mol % oxygen with the majority of the remainder being nitrogen and argon. The oxygen, nitrogen and argon are referred to as "contaminant gases".

The bulk of the oxygen in the flue gas originates from the excess oxygen required for complete coal combustion. The remaining oxygen originates from air leaking into the boiler and convection section. The nitrogen and argon in the flue gas originates from the oxygen feed for coal combustion, which would typically have a purity of 90 mol % to 99.6 mol %, and usually 95 mol % to 97 mol %, oxygen, and from air leaking into the boiler and convection section.

Also present in the flue gas are impurities such as acid gases and other impurities derived from the coal and the combustion process. The impurities include sulfur dioxide, sulfur trioxide, hydrogen fluoride, hydrogen chloride, nitric oxide, nitrogen dioxide, mercury, etc. The total amount of these impurities in the flue gas (after washing and drying) depends on the composition of the fuel and the combustion conditions.

The flue gas must be purified before carbon dioxide from the flue gas can be stored in, for example, geological formations. In this connection, water soluble components such as sulfur trioxide, hydrogen chloride and hydrogen fluoride, are usually removed from the flue gas by direct contact with water which not only washes out these components but also cools the flue gas and condenses water vapor. Sulfur dioxide and the oxides of nitrogen may be removed during compression of the carbon dioxide to pipeline pressure as disclosed in U.S. patent application Ser. No. 11/287,640 filed on 28 Nov. 2005, the disclosure of which is incorporated herein by reference. This process also removes any mercury that may be present in the carbon dioxide.

The pipeline pressure of carbon dioxide will usually be from about 100 bar to about 250 bar which is well above the critical pressure of carbon dioxide. The bulk of the contaminant gases is preferably removed to reduce the power required to compress the carbon dioxide and to ensure that two phase flow conditions do not arise in the pipeline or in the geological formation in which the carbon dioxide is to be stored.

The presence of oxygen may present problems when the carbon dioxide is intended for use in enhanced oil or gas recovery operations due to the possibility of oxidation causing corrosion problems in downhole equipment. The typical specifications for carbon dioxide purity would be a maximum contaminants level of 3 mol % and, in the case of the use of carbon dioxide for enhanced oil recovery, the maximum oxygen content would be typically 100 ppm or lower, even as low as 1 ppm.

The current technology for the next stage of carbon dioxide purification uses a technique in which the contaminant gases are removed from the compressed dried pre-purified crude carbon dioxide stream at about 30 bar pressure by cooling the crude carbon dioxide to a temperature very close to the freezing point of carbon dioxide, where the carbon dioxide partial pressure is from about 7 bar to about 8 bar. The residual gas containing about 25 mol % carbon dioxide is separated and vented after heating and work expansion to produce power. This single process results in a carbon dioxide recovery of about 90%. The process of oxyfuel combustion would be considerably improved if very high carbon dioxide recoveries, e.g. above 97%, could be achieved economically.

The current technology for delivery of carbon dioxide from the oxyfuel combustion of fossil fuel to a geological storage site is based on compression to a pipeline pressure of typically about 100 bar to about 250 bar. An alternative technology for smaller sources of carbon dioxide emission, or where a pipeline might be too expensive, is to liquefy the carbon dioxide and transport the carbon dioxide at a pressure below its critical pressure as a liquid in, for example, a large seaborne tanker. The oxyfuel combustion process would be significantly improved if the carbon dioxide purification process could produce economically a liquid carbon dioxide product rather than a stream of supercritical carbon dioxide at near ambient temperature for pipeline delivery.

An important objective for carbon capture in an oxyfuel power system is to provide a method of treating compressed crude carbon dioxide to remove nitrogen and argon and to reduce the concentration of oxygen to less than 100 ppm, preferably with low consumption of energy and high recovery of carbon dioxide. Carbon dioxide recovery (based on carbon dioxide in the total flue gas stream) should ideally be better than 97%. In addition, if the purified carbon dioxide product is produced as a low temperature liquid stream at a pressure below its critical pressure, transportation as a liquid or as a supercritical fluid to a carbon dioxide storage site is facilitated.

FIG. 1 depicts a flow sheet for a prior art process for removal of contaminant gases from crude carbon dioxide produced in an oxyfuel combustion process. The process is disclosed in "*Carbon Dioxide Capture for Storage in Deep Geological Formations—Results from the $CO_2$ Capture Project*" (Capture and Separation of Carbon Dioxide from Combustion Sources; Vol. 1; Chapter 26; pp 451-475; Elsevier).

In FIG. 1, the carbon dioxide separation is carried out in a low temperature processing plant which uses carbon dioxide refrigeration to cool the crude carbon dioxide feed gas down to a temperature within about 2° C. of the carbon dioxide freezing temperature. At this point, a phase separation of the uncondensed gas takes place and the gas phase, containing about 25 mol % carbon dioxide and about 75 mol % contaminant gases is separated, warmed and work expanded to produce power before being vented to atmosphere.

The process separates the contaminant gases from the carbon dioxide at a temperature of −54.5° C. at a point close to the freezing temperature of the feed gas mixture, where the carbon dioxide vapor pressure is 7.4 bar. The refrigeration duty is provided by evaporating two streams of liquid carbon dioxide at pressure levels of 8.7 bar and 18.1 bar in heat exchangers E101 and E102. The two resultant carbon dioxide gas streams are fed to the carbon dioxide compressors, K101 and K102, which usually will be stages of a multistage compressor.

In FIG. 1, a feed 130 of carbonaceous fuel is combusted with a feed 132 of oxygen in an oxyfuel combustion unit R101 to produce a stream 134 of flue gas, the heat of which is used to generate steam in a power generation plant (not shown). Stream 134 is divided into a major part (stream 138) and a minor part (stream 136). Stream 138 is recycled to the oxyfuel combustion unit R101. Stream 136 of flue gas is washed with water in a gas-liquid contact vessel C105 to remove water soluble components and produce crude carbon dioxide gas. A stream 142 of water is fed to the vessel C105 and a stream 144 of water comprising water soluble components from the flue gas is removed therefrom to provide a stream 146 of crude carbon dioxide gas (comprising about 73 mol % carbon dioxide).

The stream 146 of is compressed in compressor K105 to produce a stream 1 of compressed crude carbon dioxide at a pressure of about 30 bar. Stream 1 is dried to a dewpoint of less than −60° C. in a pair of thermally regenerated desiccant driers C103 to produce a stream 2 of dried waste carbon dioxide gas. Stream 2 is cooled by indirect heat exchange in the heat exchanger E101 to about −23° C. to produce a stream 3 of crude gaseous carbon dioxide which is fed to a phase separation vessel C101 where it is separated to produce a first carbon dioxide-enriched liquid and a first vapor containing the majority of the contaminant gases.

A stream 4 of first carbon dioxide-enriched liquid is reduced in pressure in valve V101 to about 18 bar to produce a stream 5 of reduced pressure first carbon dioxide-enriched liquid which is vaporized by indirect heat exchange in heat exchanger E101 to provide refrigeration and to produce a stream 6 of first carbon dioxide-enriched gas.

A stream 7 of first vapor from phase separator C101 is cooled by indirect heat exchange in the heat exchanger E102 to −54.5° C. to produce a stream 8 of partially condensed fluid which is fed to a second phase separation vessel C102 where it is separated into second carbon dioxide-enriched liquid and a second vapor, containing the majority of the remaining contaminant gases.

A stream 13 of second carbon dioxide-enriched liquid is warmed to a temperature of about −51° C. by indirect heat exchange in heat exchanger E102 to produce a stream 14 of warmed second carbon dioxide-enriched liquid which is reduced in pressure to 8.7 bar in valve V102 to produce a stream 15 of reduced pressure second carbon dioxide-enriched liquid. Stream 15 is vaporized and warmed by indirect heat exchange in the heat exchangers E101, E102 to provide refrigeration and produce a stream 16 of second carbon dioxide-enriched gas. The initial warming of stream 13 in heat exchanger E102 is critical to prevent freezing of the second carbon dioxide-enriched liquid on pressure reduction from about 30 bar.

A stream 9 of the second vapor from phase separator C102 is heated by indirect heat exchange to ambient temperature in the heat exchangers E101, E102 to produce a stream 10 of warmed second gas which is heated by indirect heat exchange in pre-heater E103 to about 300° C. to produce a stream 11 of pre-heated second gas. Stream 11 is work expanded in turbine K103 to produce power and a stream 12 of waste gas comprising about 25 mol % carbon dioxide and most of the contaminant gases which is then vented the atmosphere.

Stream 16 is compressed in the first stage K102 of a multi-stage centrifugal carbon dioxide compressor to produce a stream 17 of compressed carbon dioxide gas at a pressure of about 18 bar. Heat of compression is removed from stream 17 in an intercooler E104 using cooling water as the coolant. A stream 18 of cooled compressed carbon dioxide gas is combined with stream 6 and the combined stream is further compressed in the second or further stage(s) K101 of the compressor to produce a stream 19 of further compressed carbon dioxide gas at a pressure of about 110 bar. The concentration of carbon dioxide in stream 19 is about 96 mol %. Heat of compression is removed from stream 19 in an aftercooler E105 using boiler feed water and/or condensate as a coolant thereby heating the boiler feed water and/or condensate and producing a stream 20 of cooled further compressed carbon dioxide gas at pipeline pressure, e.g. at about 110 bar.

For simplicity, heat exchangers E101 and E102 are shown in FIG. 1 as separate heat exchangers. However, as would be appreciated by the skilled person, heat exchangers E101 and E102 would usually, in reality, form parts of the heat exchanger with feed streams entering and product streams leaving at the most thermodynamically efficient locations. The main heat exchanger E101, E102 is usually a multi-stream plate-fin heat exchanger, preferably made from aluminum.

Table 1 is a heat and mass balance table for the process depicted in FIG. 1.

TABLE 1

| | | Stream Number | | | | | | | | |
|---|---|---|---|---|---|---|---|---|---|---|
| | | 1 | 2 | 3 | 4 | 5 | 6 | 7 | 8 | 9 | 10 |
| Temperature | ° C. | 24.83 | 24.83 | −22.66 | −22.66 | −30.87 | 11.21 | −22.66 | −54.50 | −54.50 | 11.21 |
| Pressure | bar a | 30 | 30 | 29.8 | 29.8 | 18.12636 | 18.02636 | 29.8 | 29.7 | 29.7 | 29.65 |
| Flow Composition | kg/s | 140.49 | 140.40 | 140.40 | 27.73 | 27.73 | 27.73 | 112.67 | 112.67 | 37.75 | 37.75 |
| $CO_2$ | mol % | 72.7633 | 72.8651 | 72.8651 | 97.6055 | 97.6055 | 97.6055 | 67.3695 | 67.3695 | 24.7546 | 24.7546 |
| $N_2$ | mol % | 18.9694 | 18.9959 | 18.9959 | 1.5014 | 1.5014 | 1.5014 | 22.8819 | 22.8819 | 53.4392 | 53.4392 |
| Ar | mol % | 2.6956 | 2.6994 | 2.6994 | 0.3712 | 0.3712 | 0.3712 | 3.2165 | 3.2165 | 6.9090 | 6.9090 |
| $O_2$ | mol % | 5.4316 | 5.4392 | 5.4392 | 0.5218 | 0.5218 | 0.5218 | 6.5314 | 6.5314 | 14.8960 | 14.8960 |
| $H_2O$ | mol % | 0.1396 | 0.0000 | 0.0000 | 0.0000 | 0.0000 | 0.0000 | 0.0000 | 0.0000 | 0.0000 | 0.0000 |
| $SO_2$ | ppm | 0.0000 | 0.0000 | 0.0000 | 0.0000 | 0.0000 | 0.0000 | 0.0000 | 0.0000 | 0.0000 | 0.0000 |
| NO | ppm | 4.9674 | 4.9743 | 4.9743 | 0.6929 | 0.6929 | 0.6929 | 5.9254 | 5.9254 | 12.0859 | 12.0859 |
| $NO_2$ | ppm | 0.0043 | 0.0043 | 0.0043 | 0.0210 | 0.0210 | 0.0210 | 0.0006 | 0.0006 | 0.0000 | 0.0000 |

TABLE 1-continued

| | | Stream Number | | | | | | | | |
|---|---|---|---|---|---|---|---|---|---|---|
| | | 11 | 12 | 13 | 14 | 15 | 16 | 17 | 18 | 19 | 20 |
| Temperature | ° C. | 300.00 | 20.07 | −54.50 | −42.85 | −55.50 | 11.21 | 69.17 | 25.00 | 195.10 | 43.00 |
| Pressure | bar a | 29.65 | 1.1 | 29.7 | 29.65 | 8.743321 | 8.543321 | 18.12636 | 18.02636 | 110 | 110 |
| Flow Composition | kg/s | 37.75 | 37.75 | 74.92 | 74.92 | 74.92 | 74.92 | 74.92 | 74.92 | 102.65 | 102.65 |
| CO2 | mol % | 24.7546 | 24.7546 | 95.2747 | 95.2747 | 95.2747 | 95.2747 | 95.2747 | 95.2747 | 95.9012 | 95.9012 |
| N2 | mol % | 53.4392 | 53.4392 | 2.8723 | 2.8723 | 2.8723 | 2.8723 | 2.8723 | 2.8723 | 2.5038 | 2.5038 |
| Ar | mol % | 6.9090 | 6.9090 | 0.7986 | 0.7986 | 0.7986 | 0.7986 | 0.7986 | 0.7986 | 0.6837 | 0.6837 |
| O2 | mol % | 14.8960 | 14.8960 | 1.0542 | 1.0542 | 1.0542 | 1.0542 | 1.0542 | 1.0542 | 0.9111 | 0.9111 |
| H2O | mol % | 0.0000 | 0.0000 | 0.0000 | 0.0000 | 0.0000 | 0.0000 | 0.0000 | 0.0000 | 0.0000 | 0.0000 |
| SO2 | ppm | 0.0000 | 0.0000 | 0.0000 | 0.0000 | 0.0000 | 0.0000 | 0.0000 | 0.0000 | 0.0000 | 0.0000 |
| NO | ppm | 12.0859 | 12.0859 | 1.8913 | 1.8913 | 1.8913 | 1.8913 | 1.8913 | 1.8913 | 1.5692 | 1.5692 |
| NO2 | ppm | 0.0000 | 0.0000 | 0.0010 | 0.0010 | 0.0010 | 0.0010 | 0.0010 | 0.0010 | 0.0063 | 0.0063 |

The process depicted in FIG. 1 produces purified carbon dioxide having a carbon dioxide concentration of about 96 mol % and containing about 0.9 mol % oxygen at a carbon dioxide recovery of about 89%.

The general concept of using distillation to purify carbon dioxide produced in an oxyfuel combustion process is not new. In this connection, Allam et al ("A Study of the Extraction of $CO_2$ from the Flue Gas of a 500 MW Pulverized Coal Fired Boiler", Allam and Spilsbury; Energy Consers. Mgmt; Vol. 33; No. 5-8, pp 373-378; 1992) discloses a process for purifying carbon dioxide from an oxyfuel combustion process using distillation to purify the carbon dioxide to remove "heavy" impurities (such as sulfur dioxide and nitrogen dioxide), and contaminant gases including oxygen, nitrogen and argon.

In Allam et al., the carbon dioxide system is integrated with an air separation unit ("ASU"), using expansion of both the nitrogen and oxygen streams to provide refrigeration for the carbon dioxide liquefaction process. The process recycles part of the oxygen-containing stream separated from the carbon dioxide to the boiler, taking a purge stream at this point to prevent contaminants build up. A rectifying column is used at the cold end to remove lighter contaminants from the carbon dioxide stream. A second column, also at the cold end, removes sulfur dioxide and nitrogen oxides from the resultant carbon dioxide stream.

In addition, the general idea that a distillation column could be used to remove oxygen from carbon dioxide produced oxyfuel combustion process was disclosed by the Inventors in a paper entitled "Purification of Oxyfuel-Derived $CO_2$ for Sequestration or EOR" presented at the 8$^{th}$ Greenhouse Gas Control Technologies conference (GHGT-8), Trondheim, in June 2006. However, no details regarding how the general idea might be implemented were disclosed.

Other prior art includes GB-A-2151597 (Duckett; published 1985) which describes a process of using membranes to concentrate a low concentration carbon dioxide feed stream so that it can be purified using phase separation. The aim is to make liquid carbon dioxide for sale rather than to recover as much carbon dioxide as possible from a combustion process and, accordingly, carbon dioxide recovery from the feed is very low at about 70%.

GB-A-2151597 discloses the use of the carbon dioxide feed stream to provide heat to the reboiler of the distillation column. GB-A-2151597 also discloses the use of an external refrigeration source to provide the liquid required for the distillation process to work.

U.S. Pat. No. 4,602,477 (Lucadamo; published July 1986) discloses a process for taking hydrocarbon offgas and increasing its value by separating it into a light hydrocarbon stream, a heavy hydrocarbon stream, and a waste carbon dioxide stream. The presence of the carbon dioxide in the stream decreases the heating and economic value of the gas. The process uses a carbon dioxide membrane unit to perform a final removal of carbon dioxide from the light hydrocarbon product, in addition to a distillation step performed at low temperatures.

The aim of the process disclosed in U.S. Pat. No. 4,602,477 is not to produce high purity carbon dioxide but to remove carbon dioxide from the hydrocarbon feed. The distillation step produces the carbon dioxide stream as a side stream from a rectifying column having a condenser. The process also uses a stripping column to purify the heavy hydrocarbon stream.

U.S. Pat. No. 4,977,745 (Heichberger; published in December 1990) discloses a process for purifying a feed stream having a carbon dioxide feed purity of greater than 85 mol %. The high pressure residual stream is heated and expanded to recover power but an external refrigeration source is used to liquefy the carbon dioxide.

EP-A-0964215 (Novakand et al; published in December 1999) discloses the recovery of carbon dioxide from a process using carbon dioxide to freeze food. The process involves the use of a distillation column to recover the carbon dioxide. The carbon dioxide feed stream to the column provides reboiler duty to the column before being fed to the column as reflux.

U.S. Pat. No. 4,952,223 (Kirshnamurthy et al; published in August 1990) discloses a carbon dioxide liquefaction process in which the carbon dioxide recovery is improved by passing the vent gas to a PSA system to produce a carbon dioxide-enriched recycle stream and a carbon dioxide-depleted vent stream.

BRIEF SUMMARY OF THE INVENTION

According to a first aspect of the present invention, there is provided a method for oxyfuel combustion of a fuel selected from the group consisting of carbonaceous fuel; hydrocarbonaceous fuel; and mixtures thereof, said method comprising:
    combusting said fuel in the presence of oxygen in an oxy-fuel combustion unit to produce flue gas comprising carbon dioxide;
    separating carbon dioxide from feed gas comprising carbon dioxide by diffusion across at least one permeable membrane in a membrane separation system to produce separated carbon dioxide gas and vent gas; and
    feeding at least a portion of said separated carbon dioxide gas from said membrane separation system to said oxy-fuel combustion unit.

According to a second aspect of the present invention, there is provided apparatus for oxyfuel combustion process of a fuel selected from the group consisting of carbonaceous fuel; hydrocarbonaceous fuel; and mixtures thereof, said apparatus comprising:

an oxyfuel combustion unit for combusting said fuel in the presence of oxygen to produce flue gas comprising carbon dioxide;

a membrane separation system comprising at least one permeable membrane for separating carbon dioxide from feed gas comprising carbon dioxide by diffusion across said membrane(s) to produce separated carbon dioxide gas and vent gas; and a conduit arrangement for feeding separated carbon dioxide gas from said membrane separation system to said oxyfuel combustion unit.

DETAILED DESCRIPTION OF THE INVENTION

Figure 1:
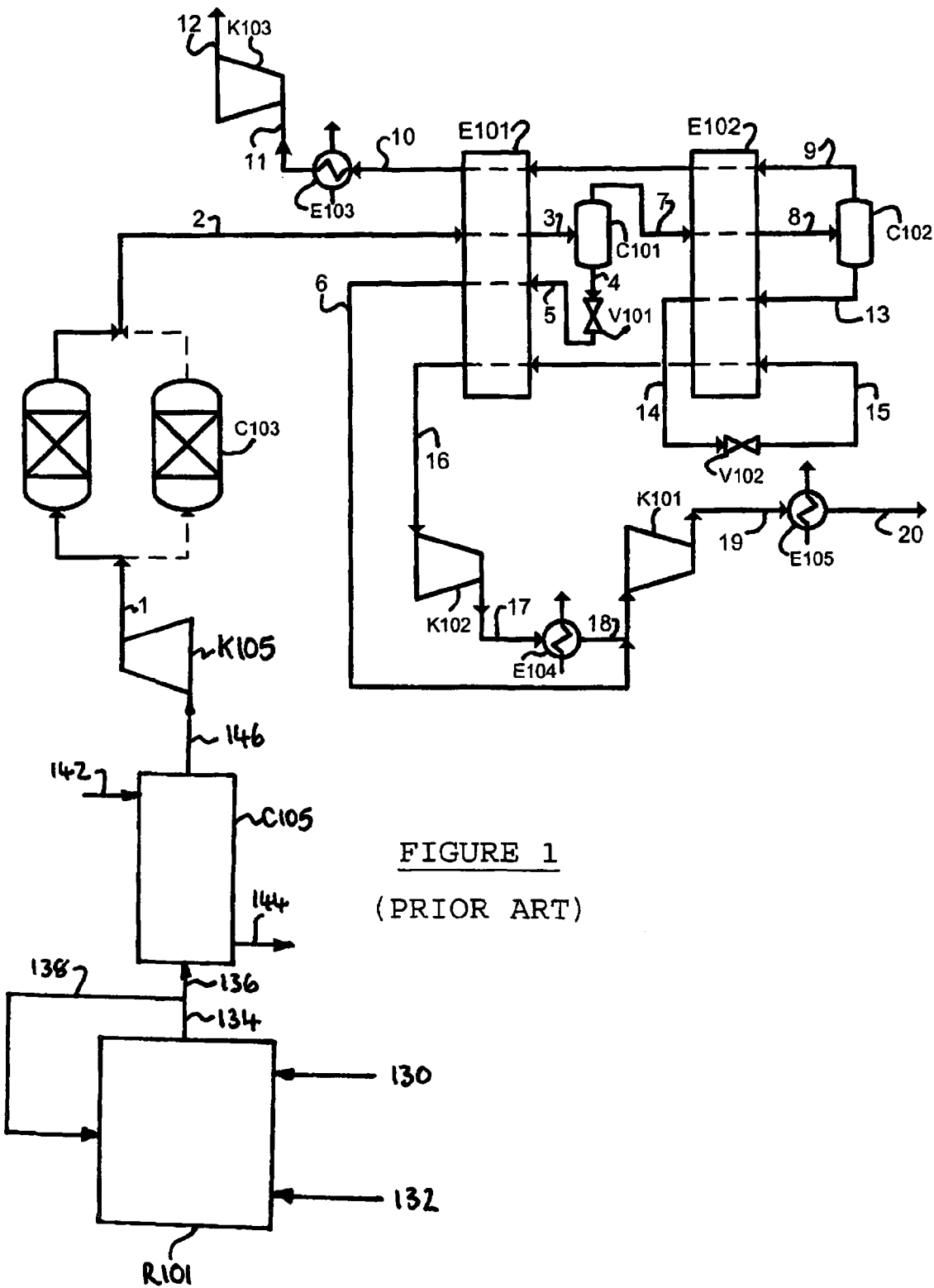
FIG. 1 is a schematic representation (flow sheet) of a prior art process for recovering carbon dioxide from flue gas produced in an oxyfuel combustion process.

The method of the present invention comprises combusting a fuel selected from carbonaceous fuel; hydrocarbonaceous fuel; and mixtures thereof, in the presence of oxygen in an oxyfuel combustion unit to produce flue gas comprising carbon dioxide. Carbon dioxide is separated from a feed gas comprising carbon dioxide by diffusion across at least one permeable membrane in a membrane separation system to produce separated carbon dioxide gas and vent gas. At least a portion of the separated carbon dioxide gas is fed from the membrane separation system to the oxyfuel combustion unit.

As is known in the art, the bulk of the flue gas is optionally recycled to the oxyfuel combustion process to help control the combustion temperature. The portion of flue gas recycled to the oxyfuel combustion process is usually over about 50%, preferably from about 60% to about 80%, depending on the desired temperature for the combustion.

Separated carbon dioxide may be fed either separately from or together with the recycled portion of flue gas. In preferred embodiments, the separated carbon dioxide and the recycled flue gas are combined and fed to the oxyfuel combustion process as a combined stream. Feeding separated carbon dioxide to the oxyfuel combustion process helps control the combustion conditions.

In particularly preferred embodiments, the feed gas to the membrane separation unit is derived from the flue gas from the oxyfuel combustion process. The feed gas is preferably produced from a carbon dioxide depleted fraction separated from said flue gas or a gas derived therefrom. Any suitable means may be used to separate the flue gas or the gas derived therefrom to produce the carbon dioxide-depleted fraction including a column system or an absorption system. However, it is preferred that a partially condensed fluid is phase separated to produce the carbon dioxide-depleted fraction.

The composition of flue gas depends on the fuel being combusted and the conditions of the oxyfuel combustion process. Flue gas usually comprises from about 65 mol % to about 90 mol % carbon dioxide. Other components that are usually present include oxygen ("$O_2$"; up to about 5 mol %), "inert gases" such as nitrogen ("$N_2$") and argon ("Ar"); and "acid gases" such as sulfur dioxide ("$SO_2$"), sulfur trioxide ("$SO_3$"), hydrogen fluoride ("HF"), hydrogen chloride ("HCl"), nitric oxide ("NO"), and nitrogen dioxide ("$NO_2$"). Water ("$H_2O$") may be present in the fuel (particularly coal) but is produced in the combustion process and, thus, is also usually present in the flue gas. Elemental mercury ("Hg") may also be present, particularly if the fuel used is coal. The bulk of the oxygen present is derived from the excess oxygen required for complete combustion of the fuel.

Where nitrogen and argon are present in the feed gas, a small portion of these inert gases also diffuses across the permeable membrane(s) with carbon dioxide and, when present, oxygen. If oxygen is recycled to the oxyfuel combustion process from the membrane separation system, thereby reducing the load on the oxygen generation system, the total amount of inert gases fed to the oxyfuel combustion process as contaminants in the oxygen feed is also is reduced. However, the diffused contaminants recycled to the oxyfuel combustion process increase the level of contaminants within the oxyfuel combustion unit.

At least the bulk of the water soluble components (e.g. acid gases) may be removed from the flue gas by washing the flue gas with water. Washing has the added advantage of also cooling the flue gas and causing the water vapor to condense. The washed gas is then compressed and dried to remove at least the bulk of the water.

In some preferred embodiments of the present invention, the method comprises:

washing at least a portion of said flue gas with water to remove water soluble components and produce washed flue gas;

drying at least a portion of said washed flue gas or a gas derived therefrom to produce contaminated carbon dioxide gas;

cooling and partially condensing at least a portion of said contaminated carbon dioxide gas or a gas derived therefrom by indirect heat exchange to produce partially condensed crude carbon dioxide fluid;

phase separating at least a portion of said partially condensed crude carbon dioxide fluid to produce impure liquid carbon dioxide and waste vapor; and feeding at least a portion of said waste vapor or a gas derived therefrom as said feed gas to said membrane separation system.

The washing step usually takes place in a counter-current gas-liquid contact vessel such as a wash (or scrub) column.

In preferred embodiments, the method comprises compressing at least a portion of said washed flue gas to produce compressed flue gas prior to drying to produce said contaminated carbon dioxide gas.

The method disclosed in U.S. Ser. No. 11/287,640 (the disclosure of which has been incorporated herein by reference) may be integrated with the method of the present invention to remove at least a portion of one or more further contaminants selected from the group consisting of sulfur dioxide and $NO_x$ (i.e. nitric oxide and nitrogen dioxide) from flue gas or a gas derived therefrom in the compression stage. In this connection, the method of the present invention may further comprise:

compressing washed gas to an elevated pressure(s), usually from about 10 bar to about 50 bar;

maintaining said washed flue gas at said elevated pressure in the presence of oxygen and water and, when sulfur dioxide is to be removed, $NO_x$, for a sufficient time to covert sulfur dioxide to sulfuric acid and/or $NO_x$ to nitric acid; and separating the sulfuric acid and/or nitric acid from the washed flue gas to produce sulfur dioxide-free, $NO_x$-lean crude carbon dioxide gas which is usually then fed to the gas drying system after further compression to the operating pressure thereof if necessary. One advantage of these embodiments is that any mercury present in the flue gas is also removed.

Where the flue gas comprises $SO_2$ and $NO_x$, the method preferably comprises converting $SO_2$ to sulfuric acid at a first elevated pressure and converting $NO_x$ to nitric acid at a second elevated pressure which is higher than the first elevated pressure. A portion of the $NO_x$ may be converted to nitric acid at the first elevated pressure. For example, if $SO_2$ feed concentration is sufficiently low, there could be more nitric acid than sulfuric acid produced at the first elevated pressure.

In these embodiments, the method usually comprises:
washing flue gas with water at said first elevated pressure in a first counter current gas/liquid contact device to produce $SO_2$-free carbon dioxide gas and an aqueous sulfuric acid solution;
compressing at least a portion of the $SO_2$-free carbon dioxide gas to the second elevated pressure; and
washing at least a portion of the $SO_2$-free carbon dioxide gas with water at the second elevated pressure in a second counter current gas/liquid contact device to produce $SO_2$-free, $NO_x$-lean carbon dioxide gas and an aqueous nitric acid solution. At least a portion of the $SO_2$-free, $NO_x$-lean carbon dioxide gas is then fed, after optional further compression if necessary, to the gas drying system for drying to produce dried crude carbon dioxide gas.

At least a portion of the aqueous sulfuric acid solution is usually recycled to the first gas/liquid contact device, optionally after pumping and/or cooling. At least a portion of the aqueous nitric acid solution is usually recycled to the second gas/liquid contact device, optionally after pumping and/or cooling.

The first elevated pressure is usually from 10 bar to 20 bar and is preferably about 15 bar. Where the flue gas is compressed to the first elevated pressure, such compression is preferably adiabatic.

The second elevated pressure is usually from 25 bar to 35 bar and is preferably about 30 bar.

The washed flue gas is usually compressed to the operating pressure of the gas drying system. In embodiments in which the gas drying system is at least one desiccant drier, the operating pressure is usually from about 10 bar to about 50 bar, and preferably from about 25 bar to about 35 bar, e.g. about 30 bar.

The method preferably comprises warming at least a portion of said waste vapor by indirect heat exchange, usually with at least one process stream, to produce waste gas prior to feeding to said membrane separation system.

The method preferably comprises:
separating at least a portion of said impure liquid carbon dioxide in a mass transfer separation column system to produce oxygen-enriched overhead vapor and carbon dioxide-enriched bottoms liquid; and
recycling at least a portion of said oxygen-enriched overhead vapor or a gas derived therefrom to said contaminated carbon dioxide gas prior to said cooling and partially condensing to produce said partially condensed crude carbon dioxide fluid.

The method preferably comprises:
warming at least a portion of said impure liquid carbon dioxide by indirect heat exchange, usually with at least one process stream, to produce warmed impure liquid carbon dioxide;
reducing the pressure of at least a portion of said warmed impure liquid carbon dioxide to produce reduced pressure impure liquid carbon dioxide; and
feeding at least a portion of said reduced pressure impure liquid carbon dioxide to said mass transfer separation column system for separation.

The pressure of the warmed impure liquid carbon dioxide is usually reduced to the operating pressure(s) of the column system. The column system usually comprises a single distillation (or stripping) column. The operating pressure of the column is usually from about 5 bar to about 50 bar, and preferably from about 14 bar to about 18 bar, e.g. about 16 bar.

The method preferably comprises:
warming at least a portion of said oxygen-enriched overhead vapor by indirect heat exchange, usually with at least one process stream, to produce oxygen-enriched gas; and
compressing at least a portion of said oxygen-enriched gas to produce compressed oxygen-enriched gas for recycle to said contaminated carbon dioxide gas.

The method of the present invention may be incorporated into the method disclosed in the sister application, U.S. Ser. No. 11/656,914 and filed on the same day as the present application, the disclosure of which is incorporated herein by reference. In such embodiments, the method may also comprise reboiling carbon dioxide-enriched bottoms liquid by indirect heat exchange against at least a portion of said contaminated carbon dioxide gas or a gas derived therefrom to provide carbon dioxide-enriched vapor for the column system. In such embodiments, reboiling provides a portion of the refrigeration duty required to cool and at least partially condense said contaminated carbon dioxide gas or said gas derived therefrom.

The pressure of the contaminated carbon dioxide gas or gas derived therefrom used to reboil the column is usually higher than the operating pressure of the column. The pressure is usually about 15 bar to about 60 bar and, preferably, from about 25 bar to about 35 bar, e.g. about 30 bar.

In other preferred embodiments of the present invention, the method comprises:
washing at least a portion of said flue gas with water to remove water soluble components and produce washed flue gas;
compressing at least a portion of said washed flue gas to produce compressed flue gas;
drying at least a portion of said compressed flue gas to produce contaminated carbon dioxide gas;
cooling and partially condensing at least a portion of said contaminated carbon dioxide gas or a gas derived therefrom by indirect heat exchange, usually with at least one process stream, to produce partially condensed crude carbon dioxide fluid;
phase separating at least a portion of said partially condensed crude carbon dioxide fluid to produce first carbon dioxide-enriched liquid and carbon dioxide-depleted vapor;
cooling and partially condensing at least a portion of said carbon dioxide-depleted vapor by indirect heat exchange, usually with at least one process stream, to produce partially condensed carbon dioxide-depleted fluid;

phase separating at least a portion of said partially condensed carbon dioxide-depleted fluid to produce second carbon dioxide-enriched liquid and waste vapor;

warming at least a portion of said waste vapor by indirect heat exchange, usually with at least one process stream, to produce said feed gas.

The method usually comprises:

heating at least a portion of the vent gas by indirect heat exchange, usually with at least one process stream, to produce heated vent gas;

work expanding at least a portion of the heated vent gas to produce power and expanded vent gas; and venting the expanded vent gas to the atmosphere.

Carbon dioxide-enriched bottoms liquid is preferably used to provide at least the majority, i.e. over 50%, preferably at least 75% and most preferably at least 90%, of the refrigeration duty required by the process. Any remaining refrigeration duty may be carried out using an external refrigerant. However, in preferred embodiments, all of the refrigeration duty required by the process is provided internally, i.e. by indirect heat exchange between process streams and without the use of an external refrigerant.

The expression "refrigeration duty" refers only to the sub-ambient refrigeration duty, i.e. the refrigeration duty below ambient temperature, and excludes cooling duty at a temperature at or above ambient temperature.

In this connection, the method usually comprises:

expanding at least a first part of the carbon dioxide-enriched bottoms liquid to produce an expanded first part at a first pressure; and vaporizing at least a portion of the expanded first part by indirect heat exchange, usually with at least one process stream, to provide a portion of the refrigeration duty required by the method and carbon dioxide gas.

The first pressure is usually from about the triple point pressure for carbon dioxide, i.e. about 5.18 bar, to about 15 bar, and is preferably no more than about 6 bar.

The method may comprise:

expanding at least one further part of said carbon dioxide-enriched bottoms liquid to produce at least one expanded further part having a pressure that is higher than said first pressure; and vaporizing at least a portion of the at least one further part by indirect hat exchange, usually with at least one process stream, to provide at least a portion of the remaining refrigeration duty required by the method and produce carbon dioxide gas.

The pressure(s) of the at least one expanded further part is usually from about the triple point pressure for carbon dioxide to about 20 bar. In some embodiments, there is only one further part which is expanded to a second pressure which is usually from about the triple point pressure for carbon dioxide to about 20 bar, preferably from about 12 bar to about 18 bar, e.g. 15 bar. In other embodiments, there are two further parts, one part being expanded to the second pressure and the other part being expanded to a third pressure which is usually higher than the first pressure and lower than the second pressure. The third pressure is usually from the triple point pressure for carbon dioxide to about 20 bar, preferably from about 8 bar to about 14 bar, e.g. about 10 bar.

In embodiments having at least two phase separation steps, the method may comprise:

expanding at least a portion of the second carbon dioxide-enriched liquid to produce expanded second carbon dioxide-enriched liquid at a pressure usually from about the triple point pressure for carbon dioxide to about 15 bar, e.g. about 9 bar; and vaporizing at least a portion of said expanded second carbon dioxide-enriched liquid by indirect heat exchange, usually with at least one process stream, to provide refrigeration duty and produce carbon dioxide gas. Such embodiments usually also comprise:

expanding at least a portion of the first carbon dioxide-enriched liquid to produce expanded first carbon dioxide-enriched liquid at a pressure higher than the pressure of the expanded second carbon dioxide-enriched liquid, usually from about 15 bar to about 25 bar, e.g. about 18 bar; and vaporizing at least a portion of said expanded first carbon dioxide-enriched liquid by indirect heat exchange, usually with at least one process stream, to provide further refrigeration duty and produce carbon dioxide gas.

The carbon dioxide gas is usually then compressed in a carbon dioxide compression train to pipe line pressure, e.g. from about 100 bar to about 250 bar.

Heat of compression may removed by indirect heat exchange with a coolant. The coolant is preferably feed water for an oxyfuel boiler, for example, the boiler producing the gaseous carbon dioxide.

The method of the present invention may be incorporated into the method disclosed in the sister application, U.S. Ser. No. 11/656,922 and filed on the same day as the present application, the disclosure of which is incorporated herein by reference. In such embodiments, the method may also comprise:

compressing impure carbon dioxide gas to produce compressed impure carbon dioxide gas;

cooling at least a portion of said compressed impure carbon dioxide gas by indirect heat exchange, usually with at least one process stream, to produce impure carbon dioxide liquid;

expanding at least a portion of said impure carbon dioxide liquid to produce expanded impure carbon dioxide liquid; and separating at least a portion of said expanded impure carbon dioxide liquid in a mass transfer separation column system to produce oxygen-enriched overhead vapor and carbon dioxide-enriched bottoms liquid.

At least about 50%, and preferably at least about 80%, of the carbon dioxide in the feed gas may be separated from the feed gas to form the separated carbon dioxide gas.

Oxygen is usually present in the feed gas. Where oxygen is present, a portion of the oxygen will inevitably be separated with the carbon dioxide from the feed gas by diffusion across the membrane(s) and then subsequently fed to the oxyfuel combustion unit. In these embodiments, at least about 30 mol %, and preferably about 45 mol %, of the oxygen in the feed gas is separated from the feed gas.

Oxygen for the oxyfuel combustion process is usually produced on site using an oxygen generation plant, typically comprising a cryogenic air separation unit ("ASU"). One advantage of feeding oxygen separated from the feed gas to the membrane separation system is that the size and power requirement of the oxygen generation plant is reduced.

In preferred embodiments, the total amount of nitrogen and argon that diffuses through the membrane(s) is no more than about 30%, and preferably between from about 10% to about 30%, of the total amount of nitrogen and argon in the feed gas.

Preferably, carbon dioxide is separated from the feed gas by diffusion across at least one hollow fiber polymeric membrane in the membrane separation system.

The apparatus of the present invention comprises an oxyfuel combustion unit for combusting a fuel selected from the group consisting of carbonaceous fuel; hydrocarbonaceous fuel; and mixtures thereof, in the presence of oxygen to produce flue gas comprising carbon dioxide. The apparatus also comprises a membrane separation system comprising at least one permeable membrane for separating carbon dioxide from feed gas comprising carbon dioxide by diffusion across said membrane(s) to produce separated carbon dioxide gas and vent gas. A conduit arrangement is provided for feeding separated carbon dioxide gas from the membrane separation system to the oxyfuel combustion unit.

An "arrangement" for carrying out a particular function is at least one device adapted and constructed to carry out that function. In this connection, a "conduit arrangement" is any form of conduit suitable for transferring the relevant fluid between the indicated parts of the apparatus. An example of a suitable conduit is a pipe or pipework. However, where appropriate, a "conduit arrangement" may comprise one or more fluid passages in a main heat exchanger or other equipment such as a compressor.

A "permeable membrane" is a selective barrier that allows different gases, vapors or liquids to diffuse through the membrane at different rates. Thus, for example, the components from a gaseous mixture may be separated selectively from the mixture by applying the gaseous mixture under pressure to one side of the membrane (the "higher pressure" or "permeate" side). The components having faster rates of diffusion will tend to permeate through the membrane and collect on the other side of the membrane (the "lower pressure" side) while the components having slower rates of diffusion will tend to remain on the high pressure side.

Different gases have different rates of diffusion through a given permeable membrane. In this connection, the relative rates of diffusion through a polymeric membrane designed for the preferential diffusion of carbon dioxide is as follows:

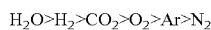

Different permeable membranes permit different rates of diffusion for a given gas depending on the "relative size" of the membrane. The "size" of a membrane is the surface area. The amount of matter that permeates through a membrane is proportional to the size of the membrane. It should be noted that relative size does not mean surface are per unit volume.

The "permeate fraction" of a particular gas is the proportion of that gas that diffuses through the membrane. The "non-permeate fraction" of a particular gas is the proportion of that gas that does not diffuse through the membrane. The membrane(s) preferably provides a permeate fraction for carbon dioxide of at least 0.7, preferably at least about 0.8, and possibly at least about 0.9. The membrane(s) also preferably provides a permeate fraction for oxygen of at least 0.3, preferably at least about 0.45, and possibly at least about 0.55.

Unfortunately, as the permeate fraction for carbon dioxide and oxygen increases, the non-permeate fraction of nitrogen and argon decreases. Therefore, the membrane(s) also preferably provides a non-permeate fraction for nitrogen of no less than 0.8, preferably no less than 0.85, and possibly no less than 0.9. Further, the membrane(s) preferably provides a non-permeate fraction for argon of no less than 0.6, preferably no less than 0.7, and possibly no less than 0.8.

In embodiments in which the feed gas comprises oxygen and at least one inert gas selected from the group consisting of nitrogen and argon, the membrane separation system is preferably selected to provide an acceptable balance between the permeation factor for oxygen and the non-permeating factor for the inert gas(es). One advantage is that a significant proportion of carbon dioxide in the feed gas also diffuses across the membrane, thereby increasing the recovery of carbon dioxide from the process.

The membranes of the present invention may be made from any suitable material such as polymers, metals, ceramics, glasses and carbon. Preferred membranes are polymeric, i.e. made from at least one polymer.

The permeable membrane(s) may have any suitable geometry including "plate and frame" and "spiral wound" geometries. However, in preferred embodiments, the geometry of the at least one permeable membrane is a hollow fiber.

The geometry of the permeable membrane(s) preferably provides a surface area per unit volume of more than about 1000 $m^2/m^3$, preferably more than about 2500 $m^2/m^3$, and most preferably more than about 5000 $m^2/m^3$.

A particularly suitable membrane separation unit is commercially available and provided under the trade mark, PRISM®, by Air Products and Chemicals, Inc. of 7201 Hamilton Boulevard, Allentown, Pa. 18195-1501, USA. A PRISM® membrane unit contains thousands of polymeric, hollow fiber membranes embedded in a thermoset resin provided within a pressure resistant vessel. The rates of diffusion of carbon dioxide, oxygen, nitrogen and argon through PRISM® membranes having different relative sizes are given below in Table 2. The "relative size" normalizes the size relative to a particular example and is usually determined on the basis of feed composition, required separation, pressure (up- and downstream) and flowrate.

TABLE 2

| Permeate Fraction | | Non-permeate Fraction | | Relative Size |
|---|---|---|---|---|
| $CO_2$ | $O_2$ | $N_2$ | Ar | |
| 0.70 | 0.37 | 0.92 | 0.83 | 1.00 |
| 0.75 | 0.41 | 0.90 | 0.81 | 1.13 |
| 0.80 | 0.46 | 0.89 | 0.78 | 1.30 |
| 0.85 | 0.51 | 0.87 | 0.75 | 1.49 |
| 0.88 | 0.55 | 0.86 | 0.73 | 1.62 |
| 0.90 | 0.58 | 0.84 | 0.70 | 1.76 |
| 0.93 | 0.63 | 0.82 | 0.67 | 1.94 |
| 0.95 | 0.68 | 0.80 | 0.63 | 2.18 |

The membrane separation system may comprise a single stage or multiple stages of membrane arrangements in any suitable configuration. The membrane separation system usually comprises at least one membrane separation unit. The or each unit comprises the membrane material(s), seal(s) to isolate the separated gases from the non-separated gases and a pressure vessel housing all of the necessary components.

The operating pressure of the membrane separation system is usually from about 10 bar to about 50 bar and, preferably, from about 25 bar to about 35 bar, e.g. about 30 bar.

The apparatus preferably comprises a separation system for producing a carbon dioxide-depleted fraction from the flue gas or a gas derived therefrom, from which fraction the feed gas is produced. The separation system may be a column system or an absorption system. However, in preferred embodiments, the separation system comprises a phase separator.

In some preferred embodiments, the apparatus comprises:
 a gas-liquid contact vessel for washing said flue gas with water to remove water soluble components and produce washed flue gas;
 a conduit arrangement for feeding flue gas from said oxyfuel combustion unit to said gas-liquid contact vessel;
 a gas drying system for drying washed flue gas or a gas derived therefrom to produce contaminated carbon dioxide gas;

a conduit arrangement for feeding washed flue gas from said gas-liquid contact vessel to said gas drying system;

at least one heat exchanger for cooling and partially condensing said contaminated carbon dioxide gas or a gas derived therefrom by indirect heat exchange, usually with at least one process stream, to produce partially condensed crude carbon dioxide fluid;

a conduit arrangement for feeding contaminated carbon dioxide gas or a gas derived therefrom from said gas drying system to said heat exchanger;

a phase separator for separating partially condensed crude carbon dioxide fluid to produce impure liquid carbon dioxide and waste vapor;

a conduit arrangement for feeding partially condensed crude carbon dioxide fluid from said heat exchanger to said phase separator; and a conduit arrangement for feeding waste vapor or a gas derived therefrom from said phase separator as said feed gas to said membrane separation system.

The conduit arrangement for feeding washed flue gas from said gas-liquid contact vessel to said gas drying system preferably comprises:

a first compressor arrangement for compressing washed flue gas to provide compressed flue gas;

a conduit arrangement for feeding washed flue gas from the gas-liquid contact vessel to the first compressor arrangement; and a conduit arrangement for feeding compressed flue gas from said first compressor arrangement to said gas drying system.

The conduit arrangement for feeding waste vapor from said phase separator to said membrane separation system may comprise:

a conduit arrangement for feeding waste vapor from said phase separator to said heat exchanger for warming to produce said feed gas;

at least one fluid passage in said heat exchanger; and a conduit arrangement for feeding feed gas from said heat exchanger to said membrane separation system.

The apparatus may comprise:

a mass transfer separation column system for separating impure liquid carbon dioxide to produce oxygen-enriched overhead vapor and carbon dioxide-enriched bottoms liquid;

a conduit arrangement for feeding impure liquid carbon dioxide from said phase separator to said column system; and a conduit arrangement for recycling oxygen-enriched overhead vapor or a gas derived therefrom from said column to said conduit arrangement for feeding contaminated carbon dioxide gas from said gas drying system to said heat exchanger.

The conduit arrangement for recycling oxygen-enriched overhead vapor may comprise:

a conduit arrangement for feeding oxygen-enriched overhead vapor from said column system to said heat exchanger for warming by indirect heat exchange, usually with at least one process stream, to produce oxygen-enriched gas;

at least one fluid passage in said heat exchanger;

a second compressor arrangement for compressing oxygen-enriched gas to produce compressed oxygen-enriched gas;

a conduit arrangement for feeding oxygen-enriched gas from said heat exchanger to said second compressor arrangement; and a conduit arrangement for feeding compressed oxygen-enriched gas from said second compressor arrangement to said conduit arrangement for feeding contaminated carbon dioxide gas from said gas drying system to said heat exchanger.

The apparatus may comprise:

a conduit arrangement for feeding impure liquid carbon dioxide from said phase separator to said heat exchanger for warming by indirect heat exchange, usually against at least one process stream, to produce warmed impure liquid carbon dioxide;

a pressure reduction arrangement for reducing the pressure of warmed impure liquid carbon dioxide to produce reduced pressure impure liquid carbon dioxide;

a conduit arrangement for feeding warmed impure liquid carbon dioxide from said heat exchanger to said pressure reduction arrangement; and a conduit arrangement for feeding reduced pressure impure liquid carbon dioxide from said pressure reduction arrangement to said column system.

The first and second compressor arrangements are typically single stage centrifugal compressors. A "pressure reduction arrangement" is typically a pressure reduction valve.

The apparatus preferably comprises:

a reboiler for said column system for reboiling carbon dioxide-enriched bottoms liquid by indirect heat exchange against crude carbon dioxide fluid to provide carbon dioxide-enriched vapor for the column system and cooled crude carbon dioxide fluid;

a conduit arrangement for feeding crude carbon dioxide fluid from said heat exchanger to said reboiler; and a conduit arrangement for feeding cooled crude carbon dioxide fluid from said reboiler to said heat exchanger.

The reboiler may be located either within the column system (e.g. in the sump of the column) or outside the column as is well known in the art.

The apparatus usually comprises:

at least one pressure reduction arrangement for reducing the pressure of carbon dioxide-enriched bottoms liquid to produce reduced pressure carbon dioxide-enriched liquid;

a conduit arrangement for feeding carbon dioxide-enriched bottoms liquid from the column system to the at least one pressure reduction arrangement;

a conduit arrangement for feeding reduced pressure carbon dioxide-enriched liquid from the at least one pressure reduction arrangement to the heat exchanger for vaporization to produce carbon dioxide gas(es);

a carbon dioxide compression system; and a conduit arrangement for feeding the carbon dioxide gas (es) from the heat exchanger to the carbon dioxide compression system.

The apparatus may comprise:

a gas-liquid contact vessel for washing said flue gas with water to remove water soluble components and produce washed flue gas;

a conduit arrangement for feeding flue gas from said oxyfuel combustion unit to said gas-liquid contact vessel;

a first compressor arrangement for compressing washed flue gas to provide compressed flue gas;

a conduit arrangement for feeding washed flue gas from said gas-liquid contact vessel to said first compressor arrangement;

a gas drying system for drying compressed flue gas to produce contaminated carbon dioxide gas;

a conduit arrangement for feeding compressed flue gas from said first compressor arrangement to said gas drying system;

at least one heat exchanger for cooling and partially condensing said contaminated carbon dioxide gas or a gas derived therefrom by indirect heat exchange, usually with at least one process stream, to produce partially condensed crude carbon dioxide fluid;

a conduit arrangement for feeding contaminated carbon dioxide gas or a gas derived therefrom from said gas drying system to said heat exchanger;

a first phase separator for separating partially condensed crude carbon dioxide fluid to produce first impure liquid carbon dioxide and carbon dioxide-depleted vapor;

a conduit arrangement for feeding partially condensed crude carbon dioxide fluid from said heat exchanger to said first phase separator;

a conduit arrangement for feeding carbon dioxide-depleted vapor to said heat exchanger for cooling and partial condensing to provide cooled and partially condensed carbon dioxide-depleted fluid;

a second phase separator for separating partially condensed carbon dioxide-depleted fluid to produce second impure liquid carbon dioxide and waste vapor;

a conduit arrangement for feeding partially condensed carbon dioxide-depleted fluid from said heat exchanger to said second phase separator;

a conduit arrangement for feeding waste vapor from said second phase separator to said heat exchanger for warming by indirect heat exchange, usually against at least one process stream, to produce said feed gas; and a conduit arrangement for feeding feed gas from said heat exchanger to said membrane separation system.

The apparatus may comprise:

a conduit arrangement for feeding second carbon dioxide-enriched liquid from the second phase separator to the heat exchanger for warming to provide warmed second carbon dioxide-enriched liquid;

a fourth pressure reduction arrangement for reducing the pressure of warmed second carbon dioxide-enriched liquid to provide expanded second carbon dioxide-enriched liquid;

a conduit arrangement for feeding warmed second carbon dioxide-enriched liquid from the heat exchanger to the fourth pressure reduction arrangement;

a conduit arrangement for feeding expanded second carbon dioxide-enriched liquid from the fourth pressure reduction arrangement to the heat exchanger for vaporization to produce carbon dioxide gas and provide refrigeration duty.

These embodiments may comprise:

a conduit arrangement for feeding first carbon dioxide-enriched liquid from the first phase separator to the heat exchanger for warming to provide warmed first carbon dioxide-enriched liquid;

a fifth pressure reduction arrangement for reducing the pressure of warmed first carbon dioxide-enriched liquid to provide expanded first carbon dioxide-enriched liquid at a pressure greater than said warmed second carbon dioxide-enriched liquid;

a conduit arrangement for feeding warmed first carbon dioxide-enriched liquid from the heat exchanger to the fifth pressure reduction arrangement;

a conduit arrangement for feeding expanded first carbon dioxide-enriched liquid from the fifth pressure reduction arrangement to the heat exchanger for vaporization to produce carbon dioxide gas and provide refrigeration duty.

Preferred embodiments of the apparatus usually comprise:

a pre-heater for heating at least a portion of the vent gas by indirect heat exchange to produce heated vent gas;

a conduit arrangement for feeding vent gas from the membrane separation unit to the pre-heater;

a turbine system for work expanding at least a portion of the heated vent gas to produce power and expanded vent gas;

a conduit arrangement for feeding heated vent gas from the pre-heater to the turbine system;

a vent for venting expanding vent gas to the atmosphere; and a conduit arrangement for feeding expanded vent gas from the turbine system to the vent.

The apparatus usually comprises a carbon dioxide compression arrangement to compress carbon dioxide gas to produce compressed carbon dioxide gas at pipe line pressure. The carbon dioxide compressor arrangement is usually a multi-stage centrifugal carbon dioxide compressor.

In embodiments including the removal of one or more contaminants selected from the group consisting of $SO_2$ and $NO_x$ from flue gas, said apparatus may comprise:

at least one counter current gas/liquid contact device for washing flue gas or a gas derived therefrom with water at elevated pressure in the presence of oxygen and, when $SO_2$ is to be removed, $NO_x$, for a sufficient time to convert $SO_2$ to sulfuric acid and/or $NO_x$ to nitric acid;

a conduit arrangement for feeding said flue gas at elevated pressure from said first compressor arrangement to the or each respective gas/liquid contact device; and a conduit arrangement(s) for recycling aqueous sulfuric acid solution and/or aqueous nitric acid solution to the or each respective gas/liquid contact device.

In embodiments where the first compressor arrangement is a multi-stage compressor, the apparatus may comprise:

a first compressor for flue gas or a gas derived therefrom to a first elevated pressure;

a conduit arrangement for feeding said flue gas to said first compressor;

a first counter current gas/liquid contact device for washing said flue gas with water at the first elevated pressure for a sufficient time to produce $SO_2$-free carbon dioxide gas and an aqueous sulfuric acid solution;

a conduit arrangement for feeding said flue gas at the first elevated pressure from the first compressor to the first gas/liquid contact device;

a conduit arrangement for recycling aqueous sulfuric acid solution to the first gas/liquid contact column;

a second compressor for compressing $SO_2$-free carbon dioxide gas to a second elevated pressure which is higher than the first elevated pressure;

a conduit arrangement for feeding $SO_2$-free carbon dioxide gas from the first counter current gas/liquid contact device to the second compressor;

a second counter current gas/liquid contact device for washing $SO_2$-free carbon dioxide gas with water at the second elevated pressure for a sufficient time to produce $SO_2$-free, $NO_x$-lean carbon dioxide gas and an aqueous nitric acid solution;

a conduit arrangement for feeding $SO_2$-free carbon dioxide gas at the second elevated pressure from the second compressor to the second gas/liquid contact device; and a conduit arrangement for recycling aqueous nitric acid solution to the second gas/liquid contact device. The first and second compressors are preferably stages of a multi-stage carbon dioxide compression arrangement.

A "pressure reduction arrangement" is typically a pressure reduction valve and the first, second, third, fourth and fifth pressure reduction arrangements are preferably separate pressure reduction valves.

At least one heat exchanger is usually a multi-stream plate fin heat exchanger having a plurality of fluid passages in which cooling stream(s) flow counter currently to warming stream(s). It is desirable that the feed stream(s) enter and the product stream(s) leave the main heat exchanger usually at the most thermodynamically efficient locations. The main heat exchanger is usually made from aluminum.

The present invention will now be described by way of example only and with reference to FIGS. 2 and 3.

Figure 2:
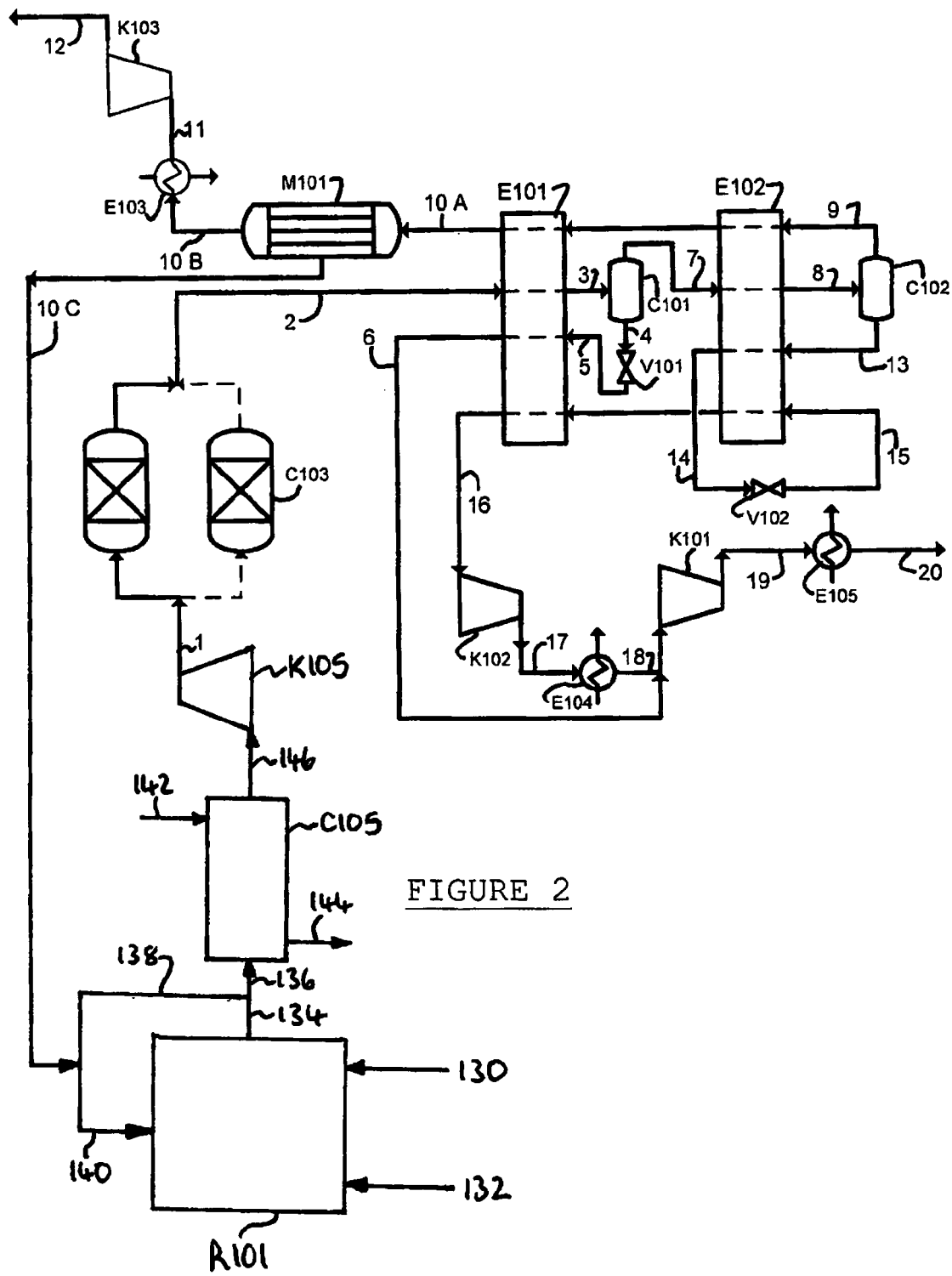
FIG. 2 is a schematic representation (flow sheet) of an embodiment of the present invention as applied to the prior art process of FIG. 1.

Much of the embodiment of the process of the present invention depicted in FIG. 2 (and, to a lesser extent, the process depicted in FIG. 3) is similar to the prior art process depicted in FIG. 1 as each process is for the recovery of carbon dioxide from flue gas generated in an oxyfuel combustion process in a power generation plant. The same reference numerals have been used in the figures to denote the features that are common between the processes. The following is a discussion of the additional features of the embodiments in FIGS. 2 and 3.

The primary distinction between the prior art process of FIG. 1 and the process depicted in FIG. 2 is that, in FIG. 1, stream 10 of warmed second gas is simply heated and then work expanded to produce power whereas, in FIG. 2, a stream 10A of warmed second gas, comprising about 29 mol % carbon dioxide and about 13 mol % oxygen and at a pressure of about 30 bar and a temperature of about 14° C., is fed to a membrane separation system M101 for recovery of carbon dioxide and oxygen.

Referring to FIG. 2, the stream 10A of waste gas leaving heat exchanger E101 at a pressure of about 30 bar is fed to the membrane separation system M101 where it is separated by diffusion into a permeate stream 10C, comprising about 63 mol % carbon dioxide and about 17 mol % oxygen, and a non-permeate stream 10B of vent gas comprising about 7 mol % carbon dioxide. The permeate stream 10C is combined with the stream 138 of flue gas from the oxyfuel combustion process and then recycled as combined stream 140 to the oxyfuel combustion unit to control the temperature of combustion. The non-permeate stream 10B is heated by indirect heat exchanger in pre-heater E103 to produce a stream 11 of heated vent gas which is expanded in a turbine system K103 to produce a stream 12 expanded vent gas and then vented to the atmosphere.

Figure 3:
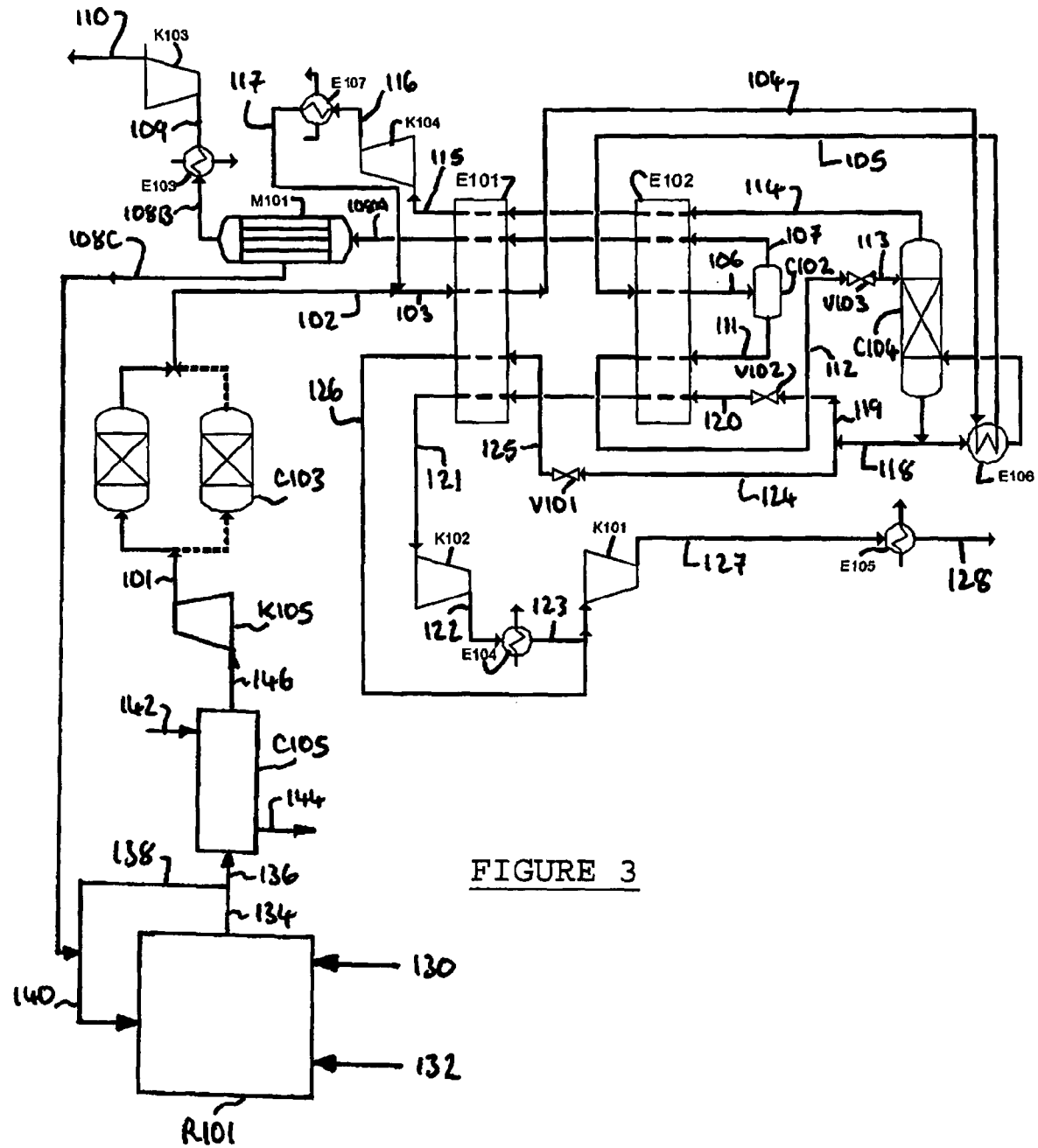
FIG. 3 is a schematic representation (flow sheet) of another embodiment of the present invention.

Referring to FIG. 3, a stream 130 of carbonaceous fuel is combusted with a stream 132 of oxygen in an oxyfuel combustion unit R101 to produce a stream 134 of flue gas. Stream 134 is divided into a major part (stream 138) which is recycled to the oxyfuel combustion unit R101, and a minor part (stream 136) which is washed with water (streams 142, 144) in a gas-liquid contact vessel C105 to produce a stream 146 of washed flue gas.

Stream 146 is compressed in a compressor K105 to a pressure of about 30 bar to produce a stream 101 of compressed flue gas comprising about 73 mol % carbon dioxide. Stream 101 is fed to a pair of thermally regenerated desiccant driers C103 where it is dried to produce a stream 102 of contaminated carbon dioxide gas. Stream 102 is combined with a stream 117 of compressed oxygen-enriched gas recycled from downstream (see below) to form a stream 103 of crude carbon dioxide gas. Stream 103 is cooled by indirect heat exchange in the heat exchanger E101 against a stream 125 of expanded carbon dioxide-enriched liquid at a pressure of about 15 bar (see below) to produce a stream 104 of crude carbon dioxide fluid and a stream 126 of carbon dioxide gas.

Stream 104 is fed to reboiler E106 to reboil carbon dioxide-enriched bottoms liquid in column C104 to produce carbon dioxide-enriched vapor for the column C104 and a stream 105 of cooled crude carbon dioxide fluid, a portion of which may be condensed. Stream 105 is further cooled in heat exchanger E102 by indirect heat exchange to produce a stream 106 of partially condensed crude carbon dioxide fluid. All of the stream 106 is fed to a cold end phase separation vessel C102 operating at about −54° C. where it is separated into waste vapor and impure liquid carbon dioxide.

A stream 107 of waste vapor is warmed to ambient temperature in heat exchangers E102 and E101 by indirect heat exchange to produce a stream 108A of waste gas which is fed to a PRISM® membrane separation system M101 where the waste gas is separated by diffusion to produce a permeate stream 108C comprising separated carbon dioxide and oxygen and a non-permeate stream 108B of vent gas. The permeate stream 108C is combined with stream 138 of flue gas from the oxyfuel combustion process and recycled to the oxyfuel combustion unit R101 as stream 140.

Stream 108B is heated by indirect heat exchange in pre-heater E103 to produce a stream 109 of heated vent gas at about 300° C. and about 30 bar. Stream 109 is work expanded in turbine system K103 to produce power and a stream 110 of expanded vent gas which is vented to the atmosphere. Stream 110 comprises about 6 mol % carbon dioxide, about 74 mol % nitrogen, about 10 mol % argon, about 10 mol % oxygen and about 18 ppm nitric oxide.

A stream 111 of the impure carbon dioxide liquid comprising about 95 mol % carbon dioxide, about 1 mol % oxygen and about 4 mol % total nitrogen and argon is removed from the phase separator C102, warmed to about −30° C. by indirect heat exchange in heat exchanger E102 to produce a stream 112 of warmed impure carbon dioxide liquid and then expanded from about 30 bar to about 17 bar in valve V103 to produce a stream 113 of expanded impure carbon dioxide liquid which is fed to the top of the column C104. Stream 111 is warmed to prevent formation of solid carbon dioxide during expansion in valve V103.

The impure carbon dioxide liquid comprising about 1 mol % oxygen is separated in column C104 to produce oxygen enriched-overhead vapor and carbon dioxide-enriched bottoms liquid. The action of the stripping process is to reduce the oxygen concentration in the carbon dioxide extracted from the column to no more than 10 ppm. The bottoms liquid is reboiled by indirect heat exchange against crude gaseous carbon dioxide fluid in reboiler E106 (see above) to provide carbon dioxide-enriched vapor for the column.

The oxygen-enriched overhead vapor contains about 68 mol % carbon dioxide, 6.4 mol % oxygen and 25.6 mol % nitrogen plus argon. The carbon dioxide concentration is too high to allow this vapor to be vented. Therefore, a stream 114 of the oxygen-enriched overhead vapor is warmed by indirect heat exchange in heat exchangers E102 and E101 to produce a stream 115 of oxygen-enriched gas. Stream 115 is compressed from about 17 bar to about 30 bar in compressor K104 to produce a stream 116 of compressed oxygen-enriched gas and the heat of compression removed by indirect heat exchange with a coolant, usually water, in aftercooler E107 to produce the stream 117 of compressed oxygen-enriched gas which is recycled to stream 102 (see above). The result of recycling stream 117 is that the entire portion of the separated gases is eventually discharged from the turbine K103 and vented to the atmosphere as stream 110.

A stream 118 of the carbon dioxide-enriched bottoms liquid is divided into two portions, stream 119 and stream 124. Refrigeration for the process is provided in part by expanding stream 119 to a pressure of about 5.6 bar in valve V102 to produce a stream 120 of expanded carbon dioxide-enriched liquid and then vaporizing and warming stream 120 in heat exchangers E102 and E101 thereby producing a stream 121 of carbon dioxide gas. Further refrigeration is provided by expanding stream 124 to a pressure of about 15 bar in valve V101 to produce a stream 125 of expanded carbon dioxide-enriched liquid and then vaporizing and warming stream 125 in heat exchanger E101 to produce a stream 126 of carbon dioxide gas.

Streams 121 and 126 are compressed and combined in a multistage centrifugal compressor K101, K102 to produce a stream 128 of compressed carbon dioxide gas at a pressure of about 110 bar. The compressed carbon dioxide gas comprises about 99.9 mol % carbon dioxide and only about 10 ppm is removed from stream 122 by indirect heat exchanger with condensate in intercooler E104 to produce a stream 123 of cooled compressed carbon dioxide gas at a pressure of about 15 bar. Stream 123 is combined with stream 126 and the combined stream is compressed in the remaining stage(s) K101 of the compressor to produce a stream 127 of further compressed carbon dioxide gas. Heat of compression is removed from stream 127 by indirect heat exchange with condensate in aftercooler E105 to produce the stream 128 of compressed carbon dioxide gas at pipeline pressure, e.g. about 110 bar.

Example 1

A computer simulation has been carried out using commercially available software (Aspen Plus 2004.1) for the process depicted in FIG. 2. A heat and mass balance table for the simulation is provided in Table 3.

TABLE 3

| | | 1 | 2 | 3 | 4 | 5 | 6 | 7 | 8 | 9 | 10A | 10B |
|---|---|---|---|---|---|---|---|---|---|---|---|---|
| Temperature | °C. | 24.29 | 24.29 | −33.43 | −33.43 | −38.82 | 14.20 | −33.43 | −50.00 | −50.00 | 14.20 | 14.20 |
| Pressure | bar a | 30 | 30 | 29.8 | 29.8 | 17.45495 | 17.35495 | 29.8 | 29.7 | 29.7 | 29.65 | 29.65 |
| Flow | kg/s | 158.33 | 158.24 | 158.24 | 85.69 | 85.69 | 85.69 | 72.55 | 72.55 | 45.91 | 45.91 | 24.93 |
| Composition | | | | | | | | | | | | |
| $CO_2$ | mol % | 73.1824 | 73.2733 | 73.2733 | 96.5628 | 96.5628 | 96.5628 | 49.9128 | 49.9128 | 29.1699 | 29.1699 | 7.2577 |
| $N_2$ | mol % | 18.8982 | 18.9217 | 18.9217 | 2.1551 | 2.1551 | 2.1551 | 35.7394 | 35.7394 | 50.7459 | 50.7459 | 73.2304 |
| Ar | mol % | 2.9662 | 2.9699 | 2.9699 | 0.6044 | 0.6044 | 0.6044 | 5.3425 | 5.3425 | 7.3905 | 7.3905 | 9.1941 |
| $O_2$ | mol % | 4.8287 | 4.8347 | 4.8347 | 0.6776 | 0.6776 | 0.6776 | 9.0045 | 9.0045 | 12.6925 | 12.6925 | 10.3161 |
| $H_2O$ | mol % | 0.1241 | 0.0000 | 0.0000 | 0.0000 | 0.0000 | 0.0000 | 0.0000 | 0.0000 | 0.0000 | 0.0000 | 0.0000 |
| $SO_2$ | ppm | 0.0000 | 0.0000 | 0.0000 | 0.0000 | 0.0000 | 0.0000 | 0.0000 | 0.0000 | 0.0000 | 0.0000 | 0.0000 |
| NO | ppm | 4.4161 | 4.4216 | 4.4216 | 0.9773 | 0.9773 | 0.9773 | 7.8763 | 7.8763 | 10.7439 | 10.7439 | 17.8210 |
| $NO_2$ | ppm | 0.0038 | 0.0038 | 0.0038 | 0.0075 | 0.0075 | 0.0075 | 0.0001 | 0.0001 | 0.0000 | 0.0000 | 0.0000 |

| | | 10C | 11 | 12 | 13 | 14 | 15 | 16 | 17 | 18 | 19 | 20 |
|---|---|---|---|---|---|---|---|---|---|---|---|---|
| Temperature | °C. | 14.20 | 300.00 | 4.91 | −50.00 | −42.97 | −55.50 | 14.20 | 69.15 | 25.00 | 193.03 | 43.00 |
| Pressure | bar a | 1.2 | 29.65 | 1.1 | 29.7 | 29.65 | 8.664452 | 8.464452 | 17.45495 | 17.35495 | 110 | 110 |
| Flow | kg/s | 20.98 | 24.93 | 24.93 | 26.64 | 26.64 | 26.64 | 26.64 | 26.64 | 26.64 | 112.33 | 112.33 |
| Composition | | | | | | | | | | | | |
| $CO_2$ | mol % | 62.4353 | 7.2577 | 7.2577 | 95.4705 | 95.4705 | 95.4705 | 95.4705 | 95.4705 | 95.4705 | 96.3031 | 96.3031 |
| $N_2$ | mol % | 16.6119 | 73.2304 | 73.2304 | 2.7803 | 2.7803 | 2.7803 | 2.7803 | 2.7803 | 2.7803 | 2.3038 | 2.3038 |
| Ar | mol % | 4.6526 | 9.1941 | 9.1941 | 0.8445 | 0.8445 | 0.8445 | 0.8445 | 0.8445 | 0.8445 | 0.6615 | 0.6615 |
| $O_2$ | mol % | 16.3002 | 10.3161 | 10.3161 | 0.9045 | 0.9045 | 0.9045 | 0.9045 | 0.9045 | 0.9045 | 0.7315 | 0.7315 |
| $H_2O$ | mol % | 0.0000 | 0.0000 | 0.0000 | 0.0000 | 0.0000 | 0.0000 | 0.0000 | 0.0000 | 0.0000 | 0.0000 | 0.0000 |
| $SO_2$ | ppm | 0.0000 | 0.0000 | 0.0000 | 0.0000 | 0.0000 | 0.0000 | 0.0000 | 0.0000 | 0.0000 | 0.0000 | 0.0000 |
| NO | ppm | 0.0000 | 17.8210 | 17.8210 | 1.5783 | 1.5783 | 1.5783 | 1.5783 | 1.5783 | 1.5783 | 1.1202 | 1.1202 |
| $NO_2$ | ppm | 0.0000 | 0.0000 | 0.0000 | 0.0003 | 0.0003 | 0.0003 | 0.0003 | 0.0003 | 0.0003 | 0.0058 | 0.0058 | oxygen. The remaining portion consists of very small quantities of nitrogen, argon and nitrogen oxides.

In the exemplified embodiment, some or all of the stages K101, K102 of the compressor are operated adiabatically and, thus, heat of compression is recoverable from the compressed carbon dioxide gas by indirect heat exchange with coolants using an intercooler E104 and an aftercooler E105.

K102 is a two stage compressor with an optional intercooler (not shown). K101 has four stages with intercooler(s) between the first two or three stages (not shown). Heat of compression can be used to pre-heat boiler feed water and/or condensate. In this connection, stream 121 is compressed in the initial stage K102 of the compressor to produce a stream 122 of compressed carbon dioxide gas. Heat of compression The process of FIG. 2 achieves about 85 mol % carbon dioxide recovery and about 50 mol % oxygen recovery (with a total of about 20 mol % diffusion of nitrogen and argon) which is equivalent to an increase in overall recovery of carbon dioxide from about 89 mol % in the prior art process of FIG. 1 to about 98 mol %. In addition, recycling excess oxygen reduces the oxyfuel oxygen demand by about 3.2%. The reduction in power required for the ASU is offset to some extent by the decrease in power recovered from the inerts expander K103. However, as carbon dioxide recovery increases, the specific power is reduced by almost 9%.

Example 2

A computer simulation has been carried out using commercially available software (Aspen Plus 2004.1) for the process depicted in FIG. 3. A heat and mass balance table for the simulation is provided in Table 4.

The process of FIG. 3 achieves about a recovery of carbon dioxide 98 mol %. In addition, recycling excess oxygen reduces the oxyfuel oxygen demand by about 3.5%.

an increase in recovery of carbon dioxide compared with the prior art process of FIG. 1.

It will be appreciated that the invention is not restricted to the details described above with reference to the preferred embodiments but that numerous modifications and variations can be made without departing from the spirit and scope of the invention as defined in the following claims.

TABLE 4

| | | Stream Number | | | | | | | | |
|---|---|---|---|---|---|---|---|---|---|---|
| | | 101 | 102 | 103 | 104 | 105 | 106 | 107 | 108A | 108B | 108C |
| Temperature | ° C. | 24.31 | 24.31 | 24.37 | −5.16 | −19.96 | −53.71 | −53.71 | 11.22 | 11.22 | 11.22 |
| Pressure | bar a | 30 | 30 | 30 | 30 | 30 | 30 | 30 | 30 | 30 | 1.2 |
| Flow Composition | kg/s | 157.78 | 157.70 | 174.72 | 174.72 | 174.72 | 174.72 | 47.98 | 47.98 | 27.41 | 20.57 |
| CO2 | mol % | 72.6149 | 72.7052 | 72.2362 | 72.2362 | 72.2362 | 72.2362 | 25.3182 | 25.3182 | 6.0531 | 57.7583 |
| N2 | mol % | 19.3542 | 19.3783 | 19.4200 | 19.4200 | 19.4200 | 19.4200 | 53.1853 | 53.1853 | 73.7502 | 18.5566 |
| Ar | mol % | 3.0702 | 3.0740 | 3.3443 | 3.3443 | 3.3443 | 3.3443 | 8.2218 | 8.2218 | 9.8283 | 5.5166 |
| O2 | mol % | 4.8360 | 4.8420 | 4.9990 | 4.9990 | 4.9990 | 4.9990 | 13.2736 | 13.2736 | 10.3666 | 18.1685 |
| H2O | mol % | 0.1243 | 0.0000 | 0.0000 | 0.0000 | 0.0000 | 0.0000 | 0.0000 | 0.0000 | 0.0000 | 0.0000 |
| SO2 | ppm | 0.0000 | 0.0000 | 0.0000 | 0.0000 | 0.0000 | 0.0000 | 0.0000 | 0.0000 | 0.0000 | 0.0000 |
| NO | ppm | 4.4227 | 4.4282 | 5.0212 | 5.0212 | 5.0212 | 5.0212 | 11.5850 | 11.5850 | 18.4649 | 0.0000 |
| NO2 | ppm | 0.0038 | 0.0038 | 0.0035 | 0.0035 | 0.0035 | 0.0035 | 0.0000 | 0.0000 | 0.0000 | 0.0000 |

| | | Stream Number | | | | | | | | |
|---|---|---|---|---|---|---|---|---|---|---|
| | | 109 | 110 | 111 | 112 | 113 | 114 | 115 | 116 | 117 | 118 |
| Temperature | ° C. | 300.00 | 49.20 | −53.71 | −29.09 | −37.55 | −37.48 | 11.22 | 68.49 | 25.00 | −24.96 |
| Pressure | bar a | 30 | 1.1 | 30 | 30 | 17.11989 | 17.11989 | 17.11989 | 30 | 30 | 17.11989 |
| Flow Composition | kg/s | 27.41 | 27.41 | 126.74 | 126.74 | 126.74 | 17.02 | 17.02 | 17.02 | 17.02 | 109.72 |
| CO2 | mol % | 6.0531 | 6.0531 | 95.1905 | 95.1905 | 95.1905 | 67.9301 | 67.9301 | 67.9301 | 67.9301 | 99.8619 |
| N2 | mol % | 73.7502 | 73.7502 | 2.9005 | 2.9005 | 2.9005 | 19.8025 | 19.8025 | 19.8025 | 19.8025 | 0.0041 |
| Ar | mol % | 9.8283 | 9.8283 | 0.9581 | 0.9581 | 0.9581 | 5.8259 | 5.8259 | 5.8259 | 5.8259 | 0.1239 |
| O2 | mol % | 10.3666 | 10.3666 | 0.9507 | 0.9507 | 0.9507 | 6.4404 | 6.4404 | 6.4404 | 6.4404 | 0.0100 |
| H2O | mol % | 0.0000 | 0.0000 | 0.0000 | 0.0000 | 0.0000 | 0.0000 | 0.0000 | 0.0000 | 0.0000 | 0.0000 |
| SO2 | ppm | 0.0000 | 0.0000 | 0.0000 | 0.0000 | 0.0000 | 0.0000 | 0.0000 | 0.0000 | 0.0000 | 0.0000 |
| NO | ppm | 18.4649 | 18.4649 | 1.8100 | 1.8100 | 1.8100 | 10.4650 | 10.4650 | 10.4650 | 10.4650 | 0.3268 |
| NO2 | ppm | 0.0000 | 0.0000 | 0.0051 | 0.0051 | 0.0051 | 0.0001 | 0.0001 | 0.0001 | 0.0001 | 0.0060 |

| | | Stream Number | | | | | | | | |
|---|---|---|---|---|---|---|---|---|---|---|
| | | 119 | 120 | 121 | 122 | 123 | 124 | 125 | 126 | 127 | 128 |
| Temperature | ° C. | −24.96 | −54.71 | 11.22 | 91.19 | 25.00 | −24.96 | −28.96 | 11.22 | 207.96 | 50.00 |
| Pressure | bar a | 17.11989 | 5.60884 | 5.60884 | 14.91758 | 14.91758 | 17.11989 | 14.91758 | 14.91758 | 110 | 110 |
| Flow Composition | kg/s | 48.01 | 48.01 | 48.01 | 48.01 | 48.01 | 61.71 | 61.71 | 61.71 | 109.72 | 109.72 |
| CO2 | mol % | 99.8619 | 99.8619 | 99.8619 | 99.8619 | 99.8619 | 99.8619 | 99.8619 | 99.8619 | 99.8619 | 99.8619 |
| N2 | mol % | 0.0041 | 0.0041 | 0.0041 | 0.0041 | 0.0041 | 0.0041 | 0.0041 | 0.0041 | 0.0041 | 0.0041 |
| Ar | mol % | 0.1239 | 0.1239 | 0.1239 | 0.1239 | 0.1239 | 0.1239 | 0.1239 | 0.1239 | 0.1239 | 0.1239 |
| O2 | mol % | 0.0100 | 0.0100 | 0.0100 | 0.0100 | 0.0100 | 0.0100 | 0.0100 | 0.0100 | 0.0100 | 0.0100 |
| H2O | mol % | 0.0000 | 0.0000 | 0.0000 | 0.0000 | 0.0000 | 0.0000 | 0.0000 | 0.0000 | 0.0000 | 0.0000 |
| SO2 | ppm | 0.0000 | 0.0000 | 0.0000 | 0.0000 | 0.0000 | 0.0000 | 0.0000 | 0.0000 | 0.0000 | 0.0000 |
| NO | ppm | 0.3268 | 0.3268 | 0.3268 | 0.3268 | 0.3268 | 0.3268 | 0.3268 | 0.3268 | 0.3268 | 0.3268 |
| NO2 | ppm | 0.0060 | 0.0060 | 0.0060 | 0.0060 | 0.0060 | 0.0060 | 0.0060 | 0.0060 | 0.0060 | 0.0060 |

Advantages of preferred embodiments of the present invention include:
- improving low temperature carbon dioxide purification;
- producing carbon dioxide at a purity of at least 97 mol %, and usually at least 99 mol %, e.g. 99.9 mol %;
- producing carbon dioxide with a very low level of oxygen or carbon monoxide, e.g. no more than 1000 ppm, typically no more than 100 ppm, and usually about 10 ppm (or even lower if required);
- producing carbon dioxide with very low levels of nitrogen and argon or other contaminants, typically a combined level of no more than 1000 ppm;
- a reduction in overall power consumption compared with the prior art process of FIG. 1 (defined as kWh/tonne of carbon dioxide separated); and

The invention claimed is:

1. A method for oxyfuel combustion of a fuel selected from the group consisting of carbonaceous fuel; hydrocarbonaceous fuel; and mixtures thereof, said method comprising:
   combusting said fuel in the presence of oxygen in an oxyfuel combustion unit to produce flue gas comprising carbon dioxide and oxygen as a contaminant gas;
   separating carbon dioxide and oxygen from feed gas comprising carbon dioxide and oxygen by diffusion across at least one permeable membrane in a membrane separation system to produce permeate gas comprising carbon dioxide and oxygen, and vent gas; and
   feeding at least a portion of said permeate gas in a conduit arrangement from said membrane separation system to said oxyfuel combustion unit to provide oxygen for combustion therein, wherein carbon dioxide and oxygen in said feed gas originate from said flue gas.

2. The method according to claim 1 wherein said feed gas is a carbon dioxide-depleted fraction separated from said flue gas.

3. The method according to claim 1 comprising:
washing at least a portion of said flue gas with water to remove water soluble components and produce washed flue gas;
drying at least a portion of said washed flue gas to produce contaminated carbon dioxide gas;
cooling and partially condensing at least a portion of said contaminated carbon dioxide gas by indirect heat exchange to produce partially condensed crude carbon dioxide fluid;
phase separating at least a portion of said partially condensed crude carbon dioxide fluid to produce impure liquid carbon dioxide and waste vapor; and
feeding at least a portion of said waste vapor as said feed gas to said membrane separation system.

4. The method according to claim 3 comprising compressing at least a portion of said washed flue gas to produce compressed flue gas prior to drying to produce said contaminated carbon dioxide gas.

5. The method according to claim 3 comprising warming at least a portion of said waste vapor by indirect heat exchange to produce waste gas prior to feeding to said membrane separation system.

6. The method according to claim 3 comprising:
separating at least a portion of said impure liquid carbon dioxide in a mass transfer separation column system to produce oxygen-enriched overhead vapor and carbon dioxide-enriched bottoms liquid; and
recycling at least a portion of said oxygen-enriched overhead vapor, or a gas derived therefrom, to said contaminated carbon dioxide gas prior to said cooling and partially condensing to produce said partially condensed crude carbon dioxide fluid.

7. The method according to claim 6 comprising:
warming at least a portion of said impure liquid carbon dioxide by indirect heat exchange to produce warmed impure liquid carbon dioxide;
reducing the pressure of at least a portion of said warmed impure liquid carbon dioxide to produce reduced pressure impure liquid carbon dioxide;
feeding at least a portion of said reduced pressure impure liquid carbon dioxide to said mass transfer separation column system for separation.

8. The method according to claim 6 comprising:
warming at least a portion of said oxygen-enriched overhead vapor by indirect heat exchange to produce oxygen-enriched gas; and
compressing at least a portion of said oxygen-enriched gas to produce compressed oxygen-enriched gas for recycle to said contaminated carbon dioxide gas.

9. The method according to claim 6 comprising reboiling carbon dioxide-enriched bottoms liquid by indirect heat exchange against at least a portion of said contaminated carbon dioxide gas, or said gas derived therefrom, to provide carbon dioxide-enriched vapor for the column system, wherein said reboiling provides a portion of the refrigeration duty required to cool and at least partially condense said contaminated carbon dioxide gas or said gas derived therefrom.

10. The method according to claim 1 comprising:
washing at least a portion of said flue gas with water to remove water soluble components and produce washed flue gas;
compressing at least a portion of said washed flue gas to produce compressed flue gas;
drying at least a portion of said compressed flue gas to produce contaminated carbon dioxide gas;
cooling and partially condensing at least a portion of said contaminated carbon dioxide gas by indirect heat exchange to produce partially condensed crude carbon dioxide fluid;
phase separating at least a portion of said partially condensed crude carbon dioxide fluid to produce first carbon dioxide-enriched liquid and carbon dioxide-depleted vapor;
cooling and partially condensing at least a portion of said carbon dioxide-depleted vapor by indirect heat exchange to produce partially condensed carbon dioxide-depleted fluid;
phase separating at least a portion of said partially condensed carbon dioxide-depleted fluid to produce second carbon dioxide-enriched liquid and waste vapor; and
warming at least a portion of said waste vapor by indirect heat exchange to produce said feed gas.

11. The method according to claim 1 wherein carbon dioxide is separated from said feed gas by diffusion across at least one hollow fiber polymeric membrane in said membrane separation system.

12. The method of claim 1, wherein at least 30 mol % of oxygen in said feed gas is separated from said feed gas in said membrane separation system.

13. Apparatus for oxyfuel combustion of a fuel selected from the group consisting of carbonaceous fuel; hydrocarbonaceous fuel; and mixtures thereof, said apparatus comprising:
an oxyfuel combustion unit for combusting said fuel in the presence of oxygen to produce flue gas comprising carbon dioxide and oxygen as a contaminant gas;
a membrane separation system comprising at least one permeable membrane for separating carbon dioxide and oxygen from feed gas comprising carbon dioxide and oxygen by diffusion across said membrane(s) to produce permeate gas comprising carbon dioxide and oxygen, and vent gas;
a conduit arrangement for feeding permeate gas from said membrane separation system to said oxyfuel combustion unit to provide oxygen for combustion therein; and
a separation system for producing said feed gas from said flue gas.

14. The apparatus of claim 13, wherein said at least one permeable membrane provides a permeate fraction for oxygen of at least 0.3.

15. Apparatus as claimed in claim 13 wherein said feed gas comprises at least one inert gas selected from the group consisting of nitrogen and argon, said membrane separation system being selected to provide a balance between the permeate fraction for oxygen and the non-permeate fraction for said inert gas(es).

16. Apparatus as claimed in claim 13 wherein at least one permeable membrane is a hollow fiber polymeric membrane.

17. Apparatus as claimed in claim 13 wherein the surface area to unit volume ratio of the membrane(s) in the membrane separation system is at least 1000 $m^2/m^3$.

18. Apparatus according to claim 13 comprising:
a gas-liquid contact vessel for washing said flue gas with water to remove water soluble components therefrom and to produce washed flue gas;

conduit arrangement for feeding flue gas from said oxyfuel combustion unit to said gas-liquid contact vessel;
a gas drying system for drying washed flue gas to produce contaminated carbon dioxide gas;
a conduit arrangement for feeding washed flue gas from said gas-liquid contact vessel to said gas drying system;
at least one heat exchanger for cooling and partially condensing said contaminated carbon dioxide gas by indirect heat exchange to produce partially condensed crude carbon dioxide fluid; and
a conduit arrangement for feeding contaminated carbon dioxide gas from said gas drying system to said heat exchanger;
wherein said separation system comprises:
a phase separator for separating partially condensed crude carbon dioxide fluid to produce impure liquid carbon dioxide and waste vapor;
a conduit arrangement for feeding partially condensed crude carbon dioxide fluid from said heat exchanger to said phase separator;
a conduit arrangement for feeding waste vapor from said phase separator as said feed gas to said membrane separation system.

19. Apparatus according to claim 18 wherein said conduit arrangement for feeding washed flue gas from said gas-liquid contact vessel to said drying system comprises:
a first compressor arrangement for compressing washed flue gas to provide compressed flue gas;
a conduit arrangement for feeding washed flue from the gas-liquid contact vessel to the first compressor arrangement; and
a conduit arrangement for feeding compressed flue gas from said first compressor arrangement to said gas drying system.

20. Apparatus according to claim 18 wherein the conduit arrangement for feeding waste vapor from said phase separator to said membrane separation system comprises:
a conduit arrangement for feeding waste vapor from said phase separator to said heat exchanger for warming to produce said feed gas;
at least one fluid passage in said heat exchanger; and
a conduit arrangement for feeding feed gas from said heat exchanger to said membrane separation system.

21. Apparatus according to claim 18 comprising:
a mass transfer separation column system for separating impure liquid carbon dioxide to produce oxygen-enriched overhead vapor and carbon dioxide-enriched bottoms liquid;
a conduit arrangement for feeding impure liquid carbon dioxide from said phase separator to said column system; and
a conduit arrangement for recycling oxygen-enriched overhead vapor or a gas derived therefrom from said column system to said conduit arrangement for feeding contaminated carbon dioxide gas from said drying system to said heat exchanger.

22. Apparatus according to claim 21 wherein said conduit arrangement for recycling oxygen-enriched overhead vapor comprises:
a conduit arrangement for feeding oxygen-enriched overhead vapor from said column system to said heat exchanger for warming by indirect heat exchange to produce oxygen-enriched gas;
at least one fluid passage in said heat exchanger;
a second compressor arrangement for compressing oxygen-enriched gas to produce compressed oxygen-enriched gas;

a conduit arrangement for feeding oxygen-enriched gas from said heat exchanger to said second compressor arrangement; and
a conduit arrangement for feeding compressed oxygen-enriched gas from said second compressor arrangement to said conduit arrangement for feeding contaminated carbon dioxide gas from said gas drying system to said heat exchanger.

23. Apparatus according to claim 21 comprising:
a conduit arrangement for feeding impure liquid carbon dioxide from said phase separator to said heat exchanger for warming by indirect heat exchange to produce warmed impure liquid carbon dioxide;
a pressure reduction arrangement for reducing the pressure of warmed impure liquid carbon dioxide to produce reduced pressure impure liquid carbon dioxide;
a conduit arrangement for feeding warmed impure liquid carbon dioxide from said heat exchanger to said pressure reduction arrangement; and
a conduit arrangement for feeding reduced pressure impure liquid carbon dioxide from said pressure reduction arrangement to said column system.

24. Apparatus according to claim 21 comprising:
a reboiler for said column system for reboiling carbon dioxide-enriched bottoms liquid by indirect heat exchange against crude carbon dioxide fluid to provide carbon dioxide-enriched vapor for the column system and cooled crude carbon dioxide fluid;
a conduit arrangement for feeding crude carbon dioxide fluid from said heat exchanger to said reboiler; and
a conduit arrangement for feeding cooled crude carbon dioxide fluid from said reboiler to said heat exchanger.

25. Apparatus according to claim 13 comprising:
a gas-liquid contact vessel for washing flue gas with water to remove water soluble components and produce washed flue gas;
a conduit arrangement for feeding flue gas from said oxyfuel combustion unit to said gas-liquid contact vessel;
a first compressor arrangement for compressing washed flue gas to provide compressed flue gas;
a conduit arrangement for feeding washed flue gas from said gas-liquid contact vessel to said first compressor arrangement;
a gas drying system for drying compressed flue gas to produce contaminated carbon dioxide gas;
a conduit arrangement for feeding compressed flue gas from said first compressor arrangement to said gas drying system;
at least one heat exchanger for cooling and partially condensing said contaminated carbon dioxide gas by indirect heat exchange to produce partially condensed crude carbon dioxide fluid; and
a conduit arrangement for feeding contaminated carbon dioxide gas from said gas drying system to said heat exchanger;
wherein said separator system comprises:
a first phase separator for separating partially condensed crude carbon dioxide fluid to produce first impure liquid carbon dioxide and carbon dioxide-depleted vapor;
a conduit arrangement for feeding partially condensed crude carbon dioxide fluid from said heat exchanger to said first phase separator;
a conduit arrangement for feeding carbon dioxide-depleted vapor from said first phase separator to said heat exchanger for cooling and partial condensing to provide cooled and partially condensed carbon dioxide-depleted fluid;

a second phase separator for separating partially condensed carbon dioxide-depleted fluid to produce second impure liquid carbon dioxide and waste vapor;

a conduit arrangement for feeding partially condensed carbon dioxide-depleted fluid from said heat exchanger to said second phase separator;

a conduit arrangement for feeding waste vapor from said second phase separator to said heat exchanger for warming to produce said feed gas; and a conduit arrangement for feeding feed gas from said heat exchanger to said membrane separation system.

* * * * *